(12) United States Patent
Hill et al.

(10) Patent No.: US 10,570,812 B2
(45) Date of Patent: Feb. 25, 2020

(54) VARIABLE GEOMETRY TURBINE

(71) Applicant: Cummins Ltd, Huddersfield (GB)

(72) Inventors: Lisa Jane Hill, Huddersfield (GB);
John F. Parker, Huddersfield (GB);
John Bywater, Huddersfield (GB)

(73) Assignee: Cummins Ltd., Huddersfield (GB)

( * ) Notice: Subject to any disclaimer, the term of this patent is extended or adjusted under 35 U.S.C. 154(b) by 283 days.

(21) Appl. No.: 15/518,089

(22) PCT Filed: Oct. 9, 2015

(86) PCT No.: PCT/GB2015/052969
§ 371 (c)(1),
(2) Date: Apr. 10, 2017

(87) PCT Pub. No.: WO2016/055808
PCT Pub. Date: Apr. 14, 2016

(65) Prior Publication Data
US 2018/0252152 A1 Sep. 6, 2018

(30) Foreign Application Priority Data

Oct. 10, 2014 (GB) .................................. 1417995.6

(51) Int. Cl.
*F02B 37/18* (2006.01)
*F01D 17/14* (2006.01)
*F02B 37/22* (2006.01)

(52) U.S. Cl.
CPC .......... *F02B 37/183* (2013.01); *F01D 17/143* (2013.01); *F05D 2220/40* (2013.01); *Y02T 10/144* (2013.01)

(58) Field of Classification Search
CPC ....... F02B 37/22; F01D 17/141; F01D 17/143
See application file for complete search history.

(56) References Cited

U.S. PATENT DOCUMENTS

| 7,428,814 | B2 | 9/2008 | Pedersen et al. |
| 7,644,583 | B2 | 1/2010 | Leavesley |
| 7,810,327 | B2 | 10/2010 | Parker |
| 8,172,516 | B2 * | 5/2012 | Parker .................. F01D 17/143 415/151 |

(Continued)

FOREIGN PATENT DOCUMENTS

| CN | 1508410 A | 6/2004 |
| CN | 1693679 A | 11/2005 |

(Continued)

OTHER PUBLICATIONS

Examination report issued by the Chinese Patent Office (summary translated to English language), dated Sep. 11, 2018, for Application No. 201580066855.7; 8 pages.

(Continued)

*Primary Examiner* — Mark A Laurenzi
*Assistant Examiner* — Jessica L Kebea
(74) *Attorney, Agent, or Firm* — Faegre Baker Daniels LLP

(57) ABSTRACT

A variable geometry turbine having a turbine wheel, an inlet passageway, a movable wall member being moveable axially to vary the width of the inlet passageway, an annular seal being mounted to the movable wall member or an adjacent housing member to provide a seal between adjacent surfaces of the movable wall member and housing member respectively, wherein a bypass passage is provided in the other of said movable wall member or housing member, extending from an inlet bypass port to an outlet bypass port, said ports being spaced from each other and provided in said adjacent surface of said other of the movable wall member or housing member, arranged such that as the movable wall member moves axially, the annular seal moves axially relative to the ports to vary the flow that may pass from a region of the cavity inboard of the seal, through the bypass passage.

20 Claims, 10 Drawing Sheets

(56) References Cited

U.S. PATENT DOCUMENTS

| | | | |
|---|---|---|---|
| 9,816,434 B1 * | 11/2017 | Luck | F02B 37/22 |
| 2004/0128997 A1 | 7/2004 | Parker | |
| 2005/0060999 A1 | 3/2005 | Mulloy et al. | |
| 2005/0262841 A1 | 12/2005 | Parker | |
| 2006/0213195 A1 | 9/2006 | Leavesley | |
| 2007/0209361 A1 | 9/2007 | Pederson et al. | |
| 2009/0064679 A1 * | 3/2009 | Parker | F01D 17/141 |
| | | | 60/602 |
| 2009/0126363 A1 | 5/2009 | Arnold et al. | |
| 2010/0037605 A1 * | 2/2010 | Garrett | F01D 17/167 |
| | | | 60/602 |
| 2011/0011085 A1 * | 1/2011 | Garrett | F01D 17/143 |
| | | | 60/615 |
| 2011/0135449 A1 * | 6/2011 | Parker | F01D 17/165 |
| | | | 415/121.2 |
| 2014/0000256 A1 | 1/2014 | Hirth et al. | |

FOREIGN PATENT DOCUMENTS

| | | | | |
|---|---|---|---|---|
| EP | 1435424 | A2 | 7/2004 | |
| EP | 1435434 | A2 | 7/2004 | |
| EP | 1187980 | B1 | 8/2005 | |
| EP | 2148043 | A2 * | 1/2010 | ........... F01D 17/143 |
| GB | 0654587 | A1 | 5/1995 | |
| GB | 2446323 | A | 8/2008 | |
| GB | 2461720 | A | 1/2010 | |
| KR | 20080063346 | A | 7/2008 | |
| WO | 0114707 | A1 | 3/2001 | |
| WO | WO2006/102912 | A1 | 10/2006 | |
| WO | 2006102912 | A1 | 10/2016 | |

OTHER PUBLICATIONS

International Search Report and Written Opinion issued by the European Patent Office, dated Dec. 23, 2015 for International Application PCT/GB2015/052969; 12 pages.

Examination report issued by the United Kingdom Intellectual Property Office, dated Apr. 1, 2015 for related Application No. GB1417995.6; 4 pages.

Examination Report issued by the Intellectual Property Office of India, dated Oct. 4, 2019 for Application No. 201717012626; 8 pages.

* cited by examiner

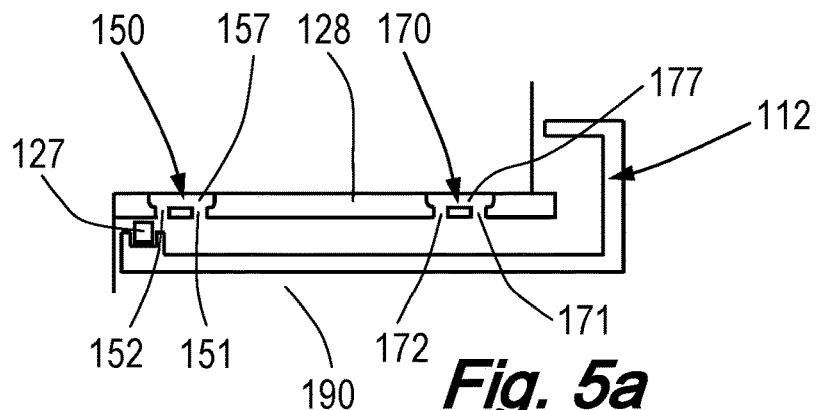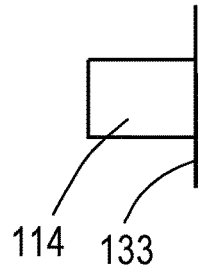
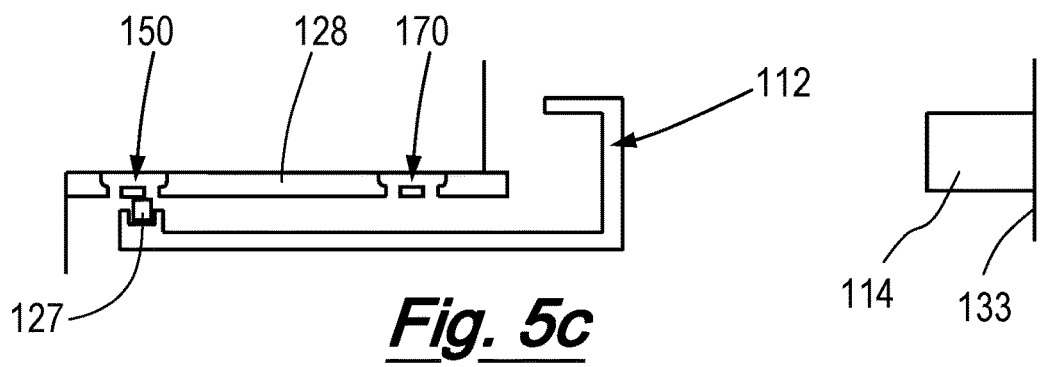
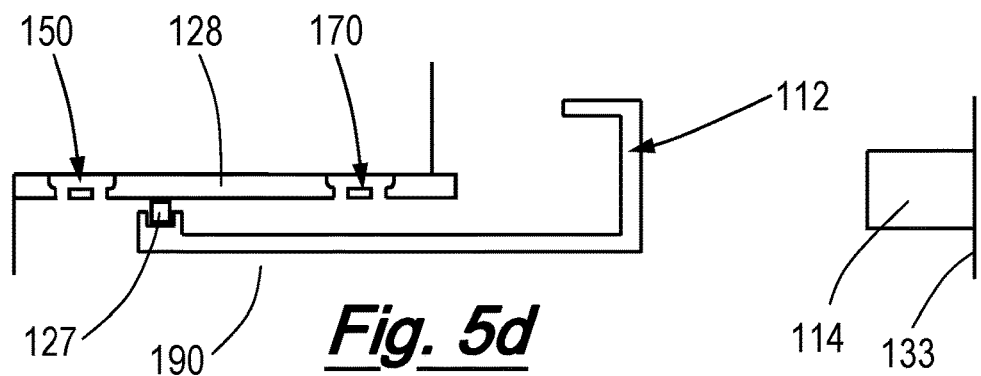

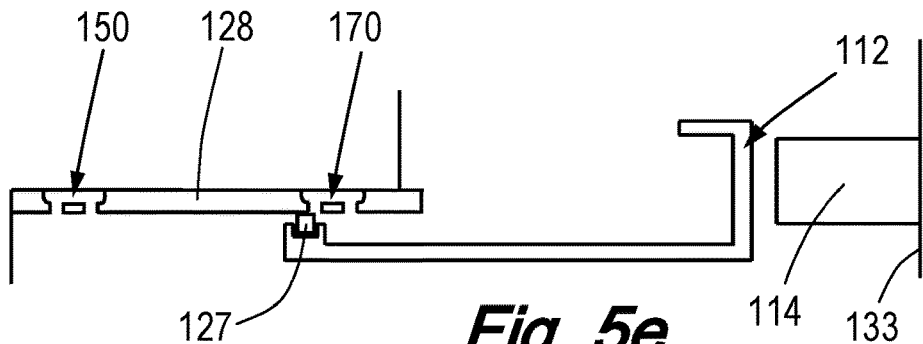
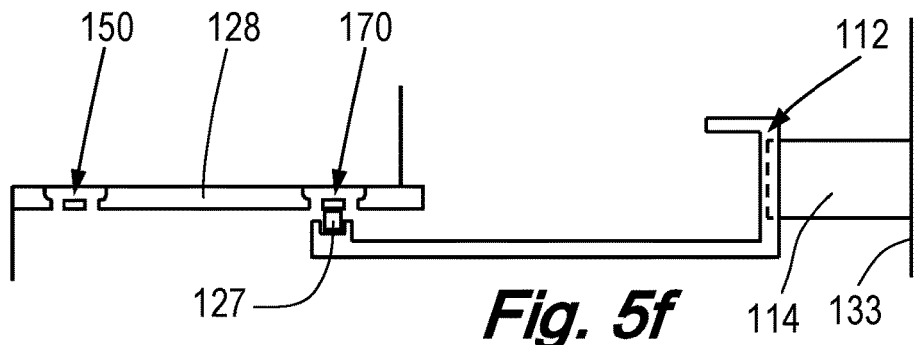
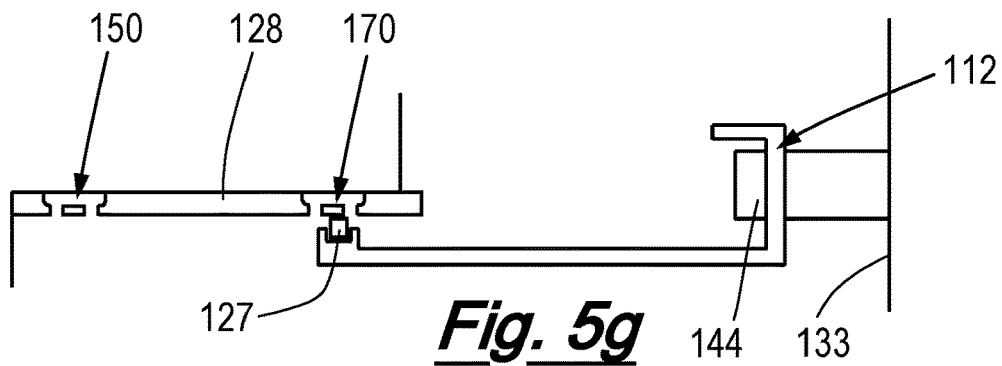
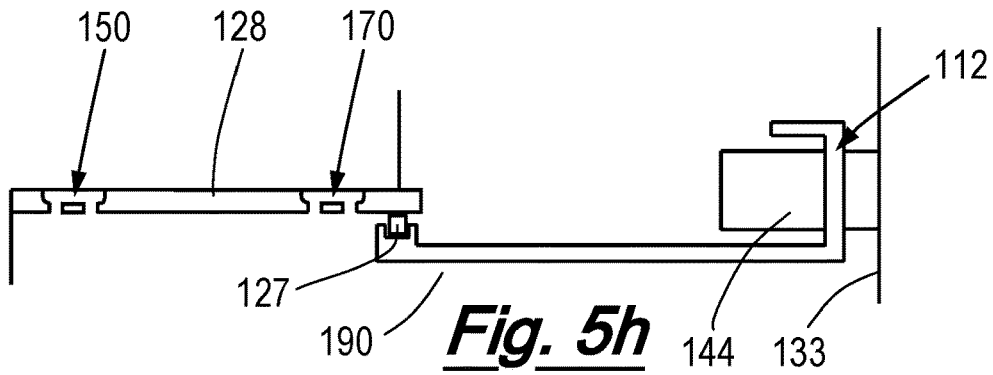

VARIABLE GEOMETRY TURBINE

FIELD OF THE DISCLOSURE

The present disclosure relates to a variable geometry turbine and has particular, but not exclusive, application to variable geometry turbochargers.

BACKGROUND

Turbochargers are well known devices for supplying air to the intake of an internal combustion engine at pressures above atmospheric (boost pressures). A conventional turbocharger essentially comprises an exhaust gas driven turbine wheel mounted on a rotatable shaft within a turbine housing. Rotation of the turbine wheel rotates a compressor wheel mounted on the other end of the shaft within a compressor housing. The compressor wheel delivers compressed air to the engine intake manifold. The turbocharger shaft is conventionally supported by journal and thrust bearings, including appropriate lubricating systems, located within a central bearing housing connected between the turbine and compressor wheel housing.

The turbine stage of a conventional turbocharger comprises: a turbine housing defining a turbine chamber within which the turbine wheel is mounted; an annular inlet passage defined in the housing between facing radially extending walls arranged around the turbine chamber; an inlet arranged around the inlet passage; and an outlet passage extending from the turbine chamber. The passages and chamber communicate such that pressurised exhaust gas admitted to the inlet flows through the inlet passage to the outlet passage via the turbine chamber and rotates the turbine wheel. It is known to improve turbine performance by providing vanes, referred to as nozzle vanes, in the inlet passage so as to deflect gas flowing through the inlet passage towards the direction of rotation of the turbine wheel.

Turbines of this kind may be of a fixed or variable geometry type. Variable geometry turbines differ from fixed geometry turbines in that the size of the inlet passage can be varied to optimise gas flow velocities over a range of mass flow rates so that the power output of the turbine can be varied in line with varying engine demands.

In one known type of variable geometry turbine, an axially moveable wall member defines one wall of the inlet passage. The position of the movable wall member relative to a fixed facing wall of the inlet passage is adjustable to control the axial width of the inlet passage. Thus, for example, as exhaust gas flow through the turbine decreases, the inlet passage width may be decreased to maintain the gas velocity and optimise turbine output.

The axially movable wall member may be a "nozzle ring" that is provided with vanes that extend into the inlet passage and through orifices provided in a shroud plate defining the fixed facing wall of the inlet passage, the orifices being designed to accommodate movement of the nozzle ring relative to the shroud. Typically the nozzle ring may comprise a radially extending wall (defining one wall of the inlet passage) and radially inner and outer axially extending walls or flanges that extend into an annular cavity behind the radial face of the nozzle ring. The cavity is formed in a part of the turbocharger housing (usually either the turbine housing or the turbocharger bearing housing) and accommodates axial movement of the nozzle ring. The flanges may be sealed with respect to the cavity walls to reduce or prevent leakage flow around the back of the nozzle ring. In one common arrangement the nozzle ring is supported on rods extending parallel to the axis of rotation of the turbine wheel and is moved by an actuator, which axially displaces the rods.

In an alternative type of variable geometry turbocharger, the nozzle ring is fixed and has vanes that extend from a fixed wall through orifices provided in a moving shroud plate.

Actuators for moving the nozzle ring or movable shroud plate can take a variety of forms, including pneumatic, hydraulic and electric and can be linked to the nozzle ring or shroud plate in a variety of ways. The actuator will generally adjust the position of the nozzle ring or movable shroud plate under the control of an engine control unit (ECU) in order to modify the airflow through the turbine to meet performance requirements.

In addition to the conventional control of a variable geometry turbocharger in an engine fired mode (in which fuel is supplied to the engine for combustion) to optimise gas flow, it is also known to take advantage of the facility to minimise the turbocharger inlet area to provide an engine braking function in an engine braking mode (in which no fuel is supplied for combustion) in which the inlet passage is reduced to smaller areas compared to those in a normal engine fired mode operating range.

Engine brake systems of various forms are widely fitted to vehicle engine systems, in particular to compression ignition engines (diesel engines) used to power large vehicles such as trucks. The engine brake systems may be employed to enhance the effect of the conventional friction brakes acting on the vehicle wheels or, in some circumstances, may be used independently of the normal friction braking system, to control, for example, the downhill speed of a vehicle. With some engine brake systems, the brake is set to activate automatically when the engine throttle is closed (i.e. when the driver lifts his foot from the throttle pedal), and in others the engine brake may require manual activation by the driver, such as depression of a separate brake pedal.

In one form of conventional engine brake system an exhaust valve in the exhaust line is controlled to block partially the engine exhaust when braking is required. This produces an engine braking torque by generating a high backpressure that retards the engine by serving to increase the work done on the engine piston during the exhaust stroke. This braking effect is transmitted to the vehicle wheels through the vehicle drive chain.

With a variable geometry turbine, it is not necessary to provide a separate exhaust valve. Rather, the turbine inlet passage may simply be "closed" to a minimum flow area when braking is required. The level of braking may be modulated by control of the inlet passage size by appropriate control of the axial position of the nozzle ring or movable shroud plate. In a "fully closed" position in an engine braking mode the nozzle ring or movable shroud plate may in some cases about the facing wall of the inlet passage.

A variable geometry turbocharger can also be operated in an engine fired mode so as to close the inlet passage to a minimum width less than the smallest width appropriate for normal engine operating conditions in order to control exhaust gas temperature. The basic principle of operation in such an "exhaust gas heating mode" is to reduce the amount of airflow through the engine for a given fuel supply level (whilst maintaining sufficient airflow for combustion) in order to increase the exhaust gas temperature. This has particular application where a catalytic exhaust after-treatment system is present. In such a system performance is directly related to the temperature of the exhaust gas that passes through it.

To achieve a desirable performance the exhaust gas temperature must be above a threshold temperature (typically lying in a range of about 250° C. to 370° C.) under all engine operating conditions and ambient conditions. Operation of the exhaust gas after-treatment system below the threshold temperature range will cause the system to build up undesirable accumulations.

These must be burnt off in a regeneration cycle to allow the system to return to designed performance levels. In this regard, thermal management or engine regeneration is a pre-determined engine process which uses exhaust gas heating, to close the inlet passage to a minimum width less than the smallest width appropriate for normal engine operating conditions, to heat the exhaust gas to a temperature that will burn off the build-up undesirable accumulations.

In addition, prolonged operation of the exhaust gas after-treatment system below the threshold temperature without regeneration will disable the system and cause the engine to become non-compliant with government exhaust emission regulations.

For the majority of the operating range of, for example, a diesel engine, the exhaust gas temperature will generally be above the required threshold temperature. However, in some conditions, such as light load conditions and/or cold ambient temperature conditions, the exhaust gas temperature can often fall below the threshold temperature. In such conditions the turbocharger can in principle be operated in the exhaust gas heating mode to reduce the turbine inlet passage width with the aim of restricting airflow thereby reducing the airflow cooling effect and increasing exhaust gas temperature.

For both engine braking and exhaust gas heating, it is important to allow some exhaust gas flow through the turbine of the turbocharger. If the exhaust from an engine is restricted to too great an extent, this can lead to excessive heat generation in the engine cylinders, failure of exhaust valves, and the like. There must therefore be provision for at least a minimum leakage flow through the turbine when the nozzle ring or movable shroud plate is moved to a position in which the inlet width is small, or in a fully closed position, for example during engine braking mode or exhaust gas heating mode.

In this respect, due to their high efficiency modern variable geometry turbochargers can generate such high boost pressures even at small inlet widths that their use in an engine braking mode can be problematic as cylinder pressures can approach, or exceed, acceptable limits unless countermeasures are taken (or braking efficiency is sacrificed). Similarly, in relation to exhaust gas heating, the high boost pressures achieved at small inlet widths can actually increase the airflow to the engine, offsetting the effect of the restriction and thus reducing the desired heating effect. By way of example, it is believed that in order to maintain the temperature of exhaust gas in an engine idling at around 1000 rpm, turbine efficiency must be 50% or less.

These problems have been addressed up to a point by EP1435434, which discloses a variable geometry turbine having an annular passageway defined between a radial wall of a moveable wall member and a facing wall of the turbine housing. The moveable wall member is mounted within an annular cavity provided within the housing and has inner and outer annular surfaces. An annular seal is disposed between an annular flange of the moveable wall member and the adjacent inner or outer annular surface of the cavity. The turbine comprises a bypass arrangement in the form of a plurality of radially extending bypass slots provided in the annular flange and distributed in the circumferential direction. Each bypass slot extends through the radial thickness off the annular flange.

The annular seal and bypass passageways move axially relative to one another as the moveable wall member moves. The annular seal and bypass passages are axially located such that as the annular wall member approaches the facing wall of the housing, the bypass passages permit the flow of exhaust gas through the cavity to the turbine wheel, thereby bypassing the annular inlet passageway.

However, with this known bypass arrangement it is only possible to provide this reduction in efficiency at a certain axial position of the movable wall member.

Furthermore, this arrangement provides relatively little control over the amount of the bypass flow that occurs at different axial positions of the movable wall member.

In this regard once the bypass slots (the circumferential array of bypass slots) are moved inboard of the seal, the bypass slots are permanently fully open. Accordingly, any further movement of the bypass slots inboard of the seal, i.e. any further inboard movement of the moveable wall member does not affect the amount of bypass flow.

In addition, this arrangement may not provide a sufficient reduction in efficiency to prevent over-pressurization of the engine cylinders during engine braking, or to off-set the reduction in the cooling effect of the airflow during exhaust gas heating.

Furthermore, the above bypass arrangement can be prone to clogging due to the build-up of soot or other particulate matter, which can reduce the effectiveness of the bypass passages, or even render them inoperable.

SUMMARY

It is one object of the present disclosure to obviate or mitigate at least one of the above disadvantages, and/or to provide an improved or alternative variable geometry turbine.

According to a first aspect of the present disclosure there is provided a variable geometry turbine comprising:

a turbine wheel supported in a housing for rotation about a turbine axis;

an annular primary inlet passageway extending radially inwards towards the turbine wheel, the primary inlet passageway being defined between a surface of a radial wall of a moveable wall member and a surface of a facing wall of the housing;

the moveable wall member being mounted within an annular cavity provided within a housing, the moveable wall member being moveable axially to vary the width of the inlet passageway;

an annular seal being mounted to one of the movable wall member and an adjacent housing member to provide a seal between adjacent surfaces of the movable wall member and housing member respectively;

wherein a bypass passage is provided in the other of said movable wall member and housing member, the bypass passage extending from an inlet bypass port to an outlet bypass port, said inlet and outlet bypass ports being axially spaced from each other and provided in said adjacent surface of said other of the movable wall member and housing member;

a secondary inlet passageway fluidly connecting a region of the cavity outboard of the seal to the turbine wheel such that flow in the secondary inlet passageway bypasses at least a portion of the primary inlet passageway;

the bypass passage and the annular seal being arranged such that as the movable wall member moves axially, the annular seal moves axially relative to the inlet and outlet bypass ports so as to vary the extent of flow that may pass from a region of the cavity inboard of the seal, through the bypass passage to the secondary inlet passageway.

This is advantageous in that the axial position of the movable wall member determines the level of bypass flow, i.e. the amount of flow that passes from a region of the cavity inboard of the seal, through the inlet port, along the bypass passage, out of the outlet bypass port and along the secondary inlet passageway to the turbine wheel. The bypass flow provides a reduction in efficiency of the turbine since the bypass flow does less work than the exhaust gas flow through the primary inlet passageway to the turbine wheel. In this regard, where vanes extend across the primary inlet passageway, the flow through the primary inlet passageway is turned in a tangential direction by the vanes, causing the flow to do more work. Accordingly, the bypass flow causes a reduction in efficiency of the turbine and a corresponding drop in compressor outflow pressure (where the turbine is coupled to a compressor to form a turbocharger), with an accompanying drop in engine cylinder pressure.

The axial position of the inlet and outlet bypass ports may be selected to provide a reduction in efficiency at certain axial positions of the movable wall member (i.e. at certain widths of the inlet passageway) such that, during exhaust gas heating and/or thermal regeneration, the high boost pressures that would otherwise be achieved at small inlet widths are reduced. This prevents an increase in the airflow to the engine, that would offset the effect of the restriction and thus reduce the desired heating effect. Accordingly, the above bypass arrangement may allow for improved exhaust gas heating and/or thermal regeneration.

Furthermore, the axial position of the inlet and outlet bypass ports may be selected to provide a reduction in efficiency at certain axial positions of the movable wall member (i.e. at certain widths of the inlet passageway) such that, during engine braking the high boost pressures that would otherwise be achieved at small inlet widths are reduced. This avoids the cylinder pressures approaching, or exceeding, acceptable limits. Accordingly, the above bypass arrangement may allow for improved engine braking.

Since the extent of the bypass flow is varied in dependence on the axial position of the movable wall member, the reduction in efficiency is varied in dependence on the axial position of the movable wall member.

Providing a bypass passage having inlet and outlet bypass ports that are axially spaced from each other and provided in said adjacent surface of the other of the annular flange and wall member, allows the level of bypass flow to be controlled to a greater extent than in the above known arrangement.

In this regard, where the bypass passage is provided in the housing member and the seal is mounted to the movable wall member, as the movable wall member moves inboard, from a fully open position, the seal moves inboard of the outlet bypass port, thereby 'opening' the outlet bypass port, i.e. allowing flow to pass from a region of the cavity inboard of the seal, through the bypass inlet port, through the bypass passage and out of the bypass outlet port to the secondary inlet passageway.

Once the outboard side of the seal passes the inboard side of the outlet bypass port, the outlet bypass port is fully 'opened'.

As the seal continues to move inboard relative to the inlet and outlet bypass ports, it then begins to 'close' the inlet bypass port, i.e. reducing the flow that can pass through the inlet bypass port into the bypass passage.

Accordingly, this allows the level of bypass flow to be controlled, after the outlet port has been fully opened. in dependence on the axial position of the movable wall member, as the movable wall member moves inboard.

This is particularly advantageous since, in some situations, it is desirable to increase the level of bypass flow to a maximum, for certain axial positions of the movable wall member (i.e. certain widths of the inlet passageway) and then to decrease it again as the movable wall member moves inboard from this position, i.e. as the width of the inlet passageway is reduced. For example, during engine braking it may be desirable to reduce the level of bypass flow at a very small width of the inlet passageway, so as to allow for sufficient back pressure for engine braking to occur.

Furthermore, by varying the axial separation of the inlet and outlet bypass ports, the level of bypass flow may be "tuned" to specific operating conditions, i.e. by providing the desired levels of bypass flow at each axial position of the movable wall member.

In addition, the cross sectional area and axial position of the inlet port can be selected to control the level of bypass flow at certain axial positions of the movable wall member.

It will be appreciated that the same advantage is obtained wherein the bypass passage is provided in the moveable wall member and the seal is mounted to the housing member. However, in this case, as the moveable wall member moves inboard, from a fully open position, the seal moves outboard of the inlet bypass port, thereby 'opening' the inlet bypass port, i.e. allowing flow to pass from a region of the cavity inboard of the seal, through the bypass inlet port, through the bypass passage and out of the bypass outlet port to the secondary inlet passageway. Once the inboard side of the seal passes the outboard side of the inlet bypass port, the inlet bypass port is fully 'opened'.

As the seal continues to move inboard relative to the inlet and outlet bypass ports, it then begins to 'close' the outlet bypass port, i.e. reducing the flow that can pass through the outlet bypass port into the bypass passage. Accordingly, this allows the level of bypass flow to be controlled as above.

Furthermore, the bypass arrangement removes the need for a bypass valve, such as a wastegate valve, that would otherwise be needed to vary the efficiency of the turbine. Such a valve would require a large and costly actuator to operate the valve. The above arrangement therefore removes the need for any such valve or actuator.

In addition, providing the inlet and outlet bypass ports in the same surface advantageously provides a relatively compact bypass arrangement, as it is not necessary for the bypass passageway to pass through the radial thickness of the annular flange or wall member respectively, i.e. with the bypass passage extending in the radial direction, between inlet and outlet ports provided on radially inner and outer surfaces of the annular flange or wall member respectively.

It will be appreciated that references to 'inboard' and 'outboard' are in relation to the primary inlet passageway. It will also be appreciated that, unless otherwise stated, references to 'radially extending', 'radial', 'axially extending', 'axial, 'circumferentially extending' and 'circumferential' are in relation to the turbine axis.

Optionally the moveable wall member has an annular flange extending axially from the radial wall into said cavity and the annular seal is mounted to one of the annular flange and the housing member.

The inlet bypass port may be provided inboard of the outlet bypass port.

The movable wall member may be axially movable relative to the facing wall of the housing, between first and second configurations, wherein in the first configuration the seal is positioned relative to the inlet and outlet bypass ports such that flow may pass from a region of the cavity inboard of the seal to the secondary inlet passageway, via the bypass passage and in the second configuration the seal is positioned relative to the inlet and outlet bypass ports such that flow is substantially prevented from passing from the region of the cavity inboard of the seal to the secondary inlet passageway, via the bypass passage.

When the movable wall member is in the first configuration, the movable wall member may be in a first position relative to the facing wall of the housing.

Optionally, when the movable wall member is in the first position, the seal is provided at least partially outboard of the inlet bypass port such that it does not cover the inlet bypass port or only partly covers an outboard portion of the inlet bypass port.

Optionally, when the movable wall member is in the first position, the seal is provided at least partially inboard of the outlet bypass port such that is does not cover the outlet bypass port or only partly covers an inboard portion of the outlet port. When the movable wall member is in the first position, the seal may be disposed axially between the inlet and outlet bypass ports.

The inlet and outlet bypass ports may be axially separated by a section of said other of said movable wall member and said housing member.

The inlet and outlet ports may have substantially the same cross-sectional area. The inlet and outlet ports may have substantially the same axial width. The outlet port may have a cross-sectional area that is the same, or greater than, the cross-sectional area of the inlet port.

When the movable wall member is in the second configuration, the movable wall member may be in a second position relative to the facing wall of the housing.

When the movable wall member is in the second position, it may be closer to the facing wall of the housing than when it is in the first position.

When the movable wall member is in the second position, the seal may substantially cover the inlet bypass port or be provided inboard of the inlet bypass port such that flow is substantially prevented from passing from the region of the cavity inboard of the seal through the inlet bypass port and into the bypass passage.

In this respect, when the movable wall member is in the second position an inboard side of the seal may be disposed inboard of an inboard side of the inlet bypass port.

When the movable wall member is in the second configuration, the movable wall member may be in a third position relative to the facing wall of the housing.

When the movable wall member is in the third position, it may be axially further from the facing wall of the housing than when the movable wall member is in the first position.

When the movable wall member is in the third position, the seal may substantially cover the outlet bypass port or be provided outboard of the outlet bypass port such that flow is substantially prevented from passing from the bypass outlet port to the secondary inlet passageway.

The inlet and outlet bypass ports may be separate ports defined by said surface of the other of the movable wall member and housing member. The inlet and outlet bypass ports may be defined only by said surface and not in combination with the seal. The size of the inlet and outlet ports may be substantially fixed as the seal moves relative to the inlet and outlet bypass ports, as the movable wall member moves axially. However, it will be appreciated that the amount that these ports are open will depend on the axial position of the movable wall member.

Each of the inlet and outlet bypass ports may be formed by an aperture provided in said surface of said other of the movable wall member and housing member. The aperture may have a substantially circular cross-sectional shape. Each of the inlet and outlet ports may extend in the circumferential direction, either partly or substantially along the circumferential extent of said other of the movable wall member and housing member.

A plurality of said inlet ports may be provided in said adjacent surface of said other of the movable wall member and housing member, distributed in the circumferential direction along said surface. The inlet ports may be substantially aligned in the axial direction. In this respect, the inlet ports may have substantially the same length in the axial direction and have centres that are substantially axially aligned.

A plurality of said outlet ports may be provided in said adjacent surface of said other of the movable wall member and housing member, distributed in the circumferential direction along said surface. The outlet ports may be substantially aligned in the axial direction. In this respect, the outlet ports may have substantially the same length in the axial direction and have centres that are substantially axially aligned.

The bypass passage may extend in the circumferential direction such that it connects a plurality of the inlet ports to a plurality of the outlet ports. The bypass passage may extend partly or substantially along the circumferential extent of said other of the movable wall member and housing member.

Alternatively, or additionally, there may be a plurality of said bypass passages, each bypass passage extending from a respective inlet port to a respective outlet port. Each bypass passage may extend from a respective inlet port that is substantially aligned, in the circumferential direction, with a respective outlet port. The plurality of bypass passages may be distributed in the circumferential direction.

The bypass passage may be arranged to direct the bypassed flow from the inlet bypass port to the outlet bypass port.

The bypass passage may form a passage that is substantially enclosed between the inlet and outlet ports. The bypass passage may be defined in whole, or in part, by said other of said movable wall member and said housing member.

The, or each, bypass passage may comprise an inlet passage that fluidly connects the, or a, bypass inlet port to a bypass chamber and an outlet passage that fluidly connects the bypass chamber to the, or an, outlet bypass port.

The bypass chamber may extend in the circumferential direction partly or substantially along the circumferential extent of said other of the movable wall member and housing member.

The seal may be mounted to the movable wall member, with the bypass passage provided in said adjacent housing member, the inlet and outlet bypass ports being provided in said adjacent surface of the housing member. In this case, inlet and outlet ports are axially fixed and the seal moves axially with the movable wall member.

Alternatively, the seal may be mounted to the adjacent housing member, with the bypass passage provided in the movable wall member, the inlet and outlet bypass ports being provided in said adjacent surface of the movable wall member. In this case, the seal is axially fixed and the inlet and outlet ports move axially with the movable wall member.

The adjacent housing member may be part of any housing of the variable geometry turbine. In this regard, the housing member may be part of the housing in which the turbine wheel is supported.

The variably geometry turbine may comprise a bearing housing that houses a bearing assembly that rotatably supports a shaft on which the turbine wheel is mounted, for rotation about said axis. In this case, the housing member may be part of the bearing housing.

The adjacent housing member may comprise an axially extending annular sleeve. The sleeve may be mounted to a radially inner surface of a housing of the variable geometry turbine, for example a radially inner surface of the bearing housing or of the housing in which the turbine wheel is supported. The sleeve may extend in the circumferential direction, either partly or substantially about the turbine axis, to form the shape of section of a cylinder or of a circumferential section of a cylinder.

The, or each, inlet and outlet passage are be provided in the sleeve, with the respective bypass chamber provided in an adjacent housing of the variable geometry turbine.

The annular cavity within which the moveable wall member is mounted may be provided in any housing of the variable geometry turbine. For example, it may be provided in the housing in which the turbine wheel is supported or in the bearing housing.

The inlet and/or outlet bypass ports of the bypass passage may each have the same or a smaller axial extent than the seal. The inlet and/or outlet bypass ports of the bypass passage may each have the same or a smaller cross-sectional area than the seal.

The bypass passage may form a first bypass feature, wherein a second bypass feature, defining a bypass flow path, is provided in said other of said moveable wall member and said housing member, and is arranged such that as the movable wall member moves axially, the annular seal moves axially relative to the second bypass feature so as to vary the extent of flow that may pass from a region of the cavity inboard of the seal, through the bypass flow path to the secondary inlet passageway.

The second bypass feature may be provided axially inboard or outboard of the first bypass passage. Preferably, the second bypass feature is provided axially inboard of the inlet bypass port of the bypass passage.

The second bypass feature may comprise a slot or recess, provided in said other of said movable wall member and said housing member, that defines said flow path. The recess may be of greater axial width than the seal.

Where the second bypass feature is provided in said sleeve, it may comprise a radially extending slot that extends through the radial thickness of the sleeve such that a radially outer end of the slot is in fluid communication with the cavity and a radially inner end of the slot is provided in said adjacent surface.

The slot or recess may extend to an axially inboard end of the sleeve such that the slot or recess is open to the cavity at its axially inboard end.

The slot or recess may be annular and may extend partly, or substantially, in the circumferential direction about the turbine axis. The second bypass feature may comprise a plurality of said recesses and/or slots, distributed in the circumferential direction. The plurality of recess and/or slots may be substantially axially aligned.

The bypass passage may form a first bypass passage, wherein the flow path of the second bypass feature is a second bypass passage provided in said other of the movable wall member or said housing member, the second bypass passage extending from an inlet bypass port to an outlet bypass port, the second bypass passage and the annular seal being arranged such that as the movable wall member moves axially, the annular seal moves axially relative to the inlet and outlet bypass ports of the second bypass passage so as to vary the extent of flow that may pass from a region of the cavity inboard of the seal, through the second bypass passage to the secondary inlet passageway.

The inlet and outlet bypass ports of the second bypass passage may be provided in the same or different surfaces of said other of the annular flange and wall member.

Where the inlet and outlet bypass ports of the second bypass passage are provided in different surfaces of said other of the annular flange and wall member, the inlet and outlet bypass ports may be provided in radially inner and outer surfaces of said other of the movable wall member and housing member, with the second bypass passage extending in the radial direction. The second bypass passage may extend substantially parallel to, or inclined relative to, the radial direction. In this respect, the inlet and outlet bypass ports of the second bypass passage may substantially axially aligned or spaced in the axial direction.

Where the inlet and outlet bypass ports of the second bypass passage are provided in the same surface of said other of the movable wall member and housing member, the second bypass passageway may have any of the above features of the first bypass passageway or of said plurality of first bypass passageways.

In this respect, the inlet and outlet bypass ports of the second bypass passage may be axially spaced from each other and provided in said adjacent surface of said other of the movable wall member and housing member.

The second bypass feature may comprise a plurality of said inlet and outlet ports provided in said adjacent surface of said other of the movable wall member and housing member, distributed in the circumferential direction along said surface. The second bypass passage may extend in the circumferential direction such that it connects a plurality of the inlet ports to a plurality of the outlet ports. Alternatively, or additionally, there may be a plurality of said second bypass passages, each bypass passage extending from a respective inlet port to a respective outlet port.

When the movable wall member is in the second position, the seal may be disposed between the first and second bypass features. Where the second bypass feature is said second bypass passage, when the movable wall member is in the second position the seal may be disposed between an adjacent respective inlet and outlet port of the first and second bypass passages.

The movable wall member may be axially movable relative to the facing wall of the housing, between third and fourth configurations, wherein in the third configuration the seal is positioned relative to the second bypass feature such that flow may pass from a region of the cavity inboard of the seal to the secondary inlet passageway, via the second bypass flow path and in the fourth configuration the seal is positioned relative to the second bypass feature such that flow is substantially prevented from passing from the region of the cavity inboard of the seal to the secondary inlet passageway, via the second bypass flow path.

When the movable wall member is in the third configuration, the movable wall member may be in a fourth position relative to the facing wall of the housing.

In the case that the second bypass feature comprises said recess, when the movable wall member is in the fourth position, the seal may be located within the axial extent of the recess such that flow may pass from a region of the cavity inboard of the seal to the secondary inlet passageway. In this case, an axially inboard side of the seal may be located axially outboard of an axially inboard side of the recess and/or an axially outboard side of the seal may be located axially inboard of an axially outboard side of the recess.

In the case that the second bypass feature comprises said second bypass passage, optionally when the movable wall member is in the fourth position, the seal does not cover the inlet bypass port or only partially covers the inlet bypass port of the second bypass passage.

Optionally, when the movable wall member is in the fourth position, the seal is provided at least partially outboard of the inlet bypass port of the second bypass passage such that it does not cover the inlet bypass port or only partly covers an outboard portion of the inlet bypass port. When the movable wall member is in the fourth position, the seal may be disposed axially between the inlet and outlet bypass ports of the second bypass passage.

The inlet and outlet bypass ports of the second bypass passage may be axially separated by a section of said other of said movable wall member and said housing member.

When the movable wall member is in the fourth configuration, the movable wall member may be in a fifth position relative to the facing wall of the housing.

When the movable wall member is in the fifth position, it may be closer to the facing wall of the housing than when it is in the fourth position.

When the movable wall member is in the fifth position, the seal may substantially cover the inlet bypass port or be provided inboard of the inlet bypass port of the second bypass passage such that flow is substantially prevented from passing from the region of the cavity inboard of the seal through the inlet bypass port and into the bypass passage.

In this respect, when the movable wall member is in the fifth position an inboard side of the seal may be disposed inboard of an inboard side of the inlet bypass port of the second bypass passage.

When the movable wall member is in the fourth configuration, the movable wall member may be in a sixth position relative to the facing wall of the housing.

When the movable wall member is in the sixth position, it may be axially further from the facing wall of the housing than when the movable wall member is in the fourth position.

When the movable wall member is in the sixth position, the seal may substantially cover the outlet bypass port or be provided outboard of the outlet bypass port of the second bypass passage such that flow is substantially prevented from passing from the second bypass passage out of the bypass outlet port to the secondary inlet passageway.

In this respect, when the movable wall member is in the sixth position an outboard side of the seal may be disposed outboard of an outboard side of the outlet bypass port of the second bypass passage.

An array of inlet guide vanes may extend across the annular primary inlet passageway to define a radial vane passage.

The secondary inlet passageway may fluidly connect a region of the cavity outboard of the seal to the turbine wheel such that flow in the secondary inlet passageway bypasses the inlet guide vanes in the primary inlet passageway.

The movable wall member may be a shroud defining apertures for receipt of the vanes, which are attached to a nozzle ring having a radial surface that corresponds to the facing of the housing.

Alternatively, the movable wall member may be a nozzle ring which supports the vanes for receipt in apertures defined by a shroud plate whose radial surface corresponds to the facing wall of the housing.

It will be appreciated that, regardless of which component defines the facing wall of the housing, the facing wall of the housing may itself be secured to the housing or it may be movable. That is, in the embodiment where the movable wall member of the present disclosure is a shroud for example, the vanes are supported by a nozzle ring which may be secured to the housing or movable.

Optionally, a particulate filter is provided in the bypass passage such that flow passing through the bypass passage passes through the filter, with the particulate filter being contacted by particulate matter flowing through the filter.

The particulate filter may comprise a high surface area material. The high surface area material may possesses a surface area that is sufficiently high to facilitate aerial oxidation of particulate matter deposited on said high surface area material.

The surface area of the high surface area material may be sufficiently high to facilitate aerial oxidation of particulate matter at a temperature of at least around 200° C.

The surface area of the high surface area material may be sufficiently high to facilitate aerial oxidation of particulate matter at a temperature of around 250° C. to 400° C.

The particulate filter may comprise a metallic material and/or ceramic material.

The metallic material may be an iron or nickel based alloy.

The ceramic material may be a magnesium based ceramic material.

The particulate filter may comprise a catalytic material suitable to catalyse the conversion of particulate matter into one or more different species. The one or more different species may comprise one or more fluids.

The catalytic material may incorporates a transition metal species.

The particulate filter may be a carbonaceous particulate filter. The carbonaceous particulate filter may comprise a catalyst suitable to catalyse the conversion of carbonaceous material to gaseous carbon dioxide and water.

The particulate filter may comprise a Diesel Particulate Filter catalyst material.

The particulate filter may comprise a mesh through which the flow may pass. The mesh may be of stainless steel.

The filter may be arranged such that substantially all the flow that passes through the bypass passage passes through the filter. The filter may extend substantially across the entire cross-sectional area of the bypass passage.

Where the bypass passage comprises said bypass chamber, the filter may be disposed within said bypass chamber.

The filter may be provided in said first and/or second bypass passages. The filter may be provided in said recess such that flow passing through the recess passes through the filter.

The mesh of the filter may have a cut-out section disposed at the inlet and/or outlet bypass port of the bypass passageway.

The mesh may be housed within a frame. The frame may be a metal frame. The frame may be of any suitable material.

According to a second aspect of the disclosure there is provided a turbocharger comprising a variable geometry turbine according to the first aspect of the disclosure and a compressor comprising a housing defining an inlet and an outlet, and a chamber between the inlet and outlet, within which an impeller wheel is rotatably mounted such that rotation of the impeller wheel compresses air received through the inlet and passes the compressed air to the outlet, wherein the turbine wheel of the turbine is coupled to the impeller wheel so as to drivably rotate the impeller wheel.

According to a third aspect of the disclosure there is provided an engine system comprising an internal combustion engine and a turbocharger according to the second aspect of the disclosure, arranged such that exhaust gas from the internal combustion engine drivably rotates the turbine wheel of the turbine.

According to a fourth aspect of the disclosure there is provided a method of operating an engine system according to the third aspect of the disclosure wherein the movable wall member is moved between said first and second configurations when the engine system is operated in an engine braking mode, a thermal regeneration mode or an exhaust gas heating mode.

Preferably the movable wall member is moved between said first and second configurations when the engine system is operated in a thermal regeneration mode or an exhaust gas heating mode.

The movable wall member may be moved between said third and fourth configurations when the engine system is operated in an engine braking mode, a thermal regeneration mode or an exhaust gas heating mode.

Preferably the movable wall member is moved between said third and fourth configurations when the engine system is operated in an engine braking mode.

BRIEF DESCRIPTION OF THE DRAWINGS

Specific embodiments of the present disclosure will now be described, by way of example only, with reference to the accompanying drawings, in which:

FIG. 5a shows a schematic cross-sectional view of a portion of a turbine according to a third embodiment of the present disclosure, where the movable shroud is in a third axial position relative to a facing wall of a housing of the turbine;

FIG. 5b shows a schematic cross-sectional view corresponding to that of FIG. 5a, where the movable shroud is in a first axial position relative to a facing wall of a housing of the turbine;

FIG. 5c shows a schematic cross-sectional view corresponding to that of FIG. 5a, where the movable shroud is in a first axial position relative to a facing wall of a housing of the turbine but located axially inboard of the position shown in FIG. 5b;

FIG. 5d shows a schematic cross-sectional view corresponding to that of FIG. 5a, where the movable shroud is in a second axial position relative to a facing wall of a housing of the turbine;

FIG. 5e shows a schematic cross-sectional view corresponding to that of FIG. 5a, where the movable shroud is in a sixth axial position relative to a facing wall of a housing of the turbine;

FIG. 5f shows a schematic cross-sectional view corresponding to that of FIG. 5a, where the movable shroud is in a fourth axial position relative to a facing wall of a housing of the turbine;

FIG. 5g shows a schematic cross-sectional view corresponding to that of FIG. 5a, where the movable shroud is in a fourth axial position relative to a facing wall of a housing of the turbine but located axially inboard of the position shown in FIG. 5f; and FIG. 5h shows a schematic cross-sectional view corresponding to that of FIG. 5a, where the movable shroud is in a fifth axial position relative to a facing wall of a housing of the turbine.

DETAILED DESCRIPTION OF EMBODIMENTS

Figure 1:
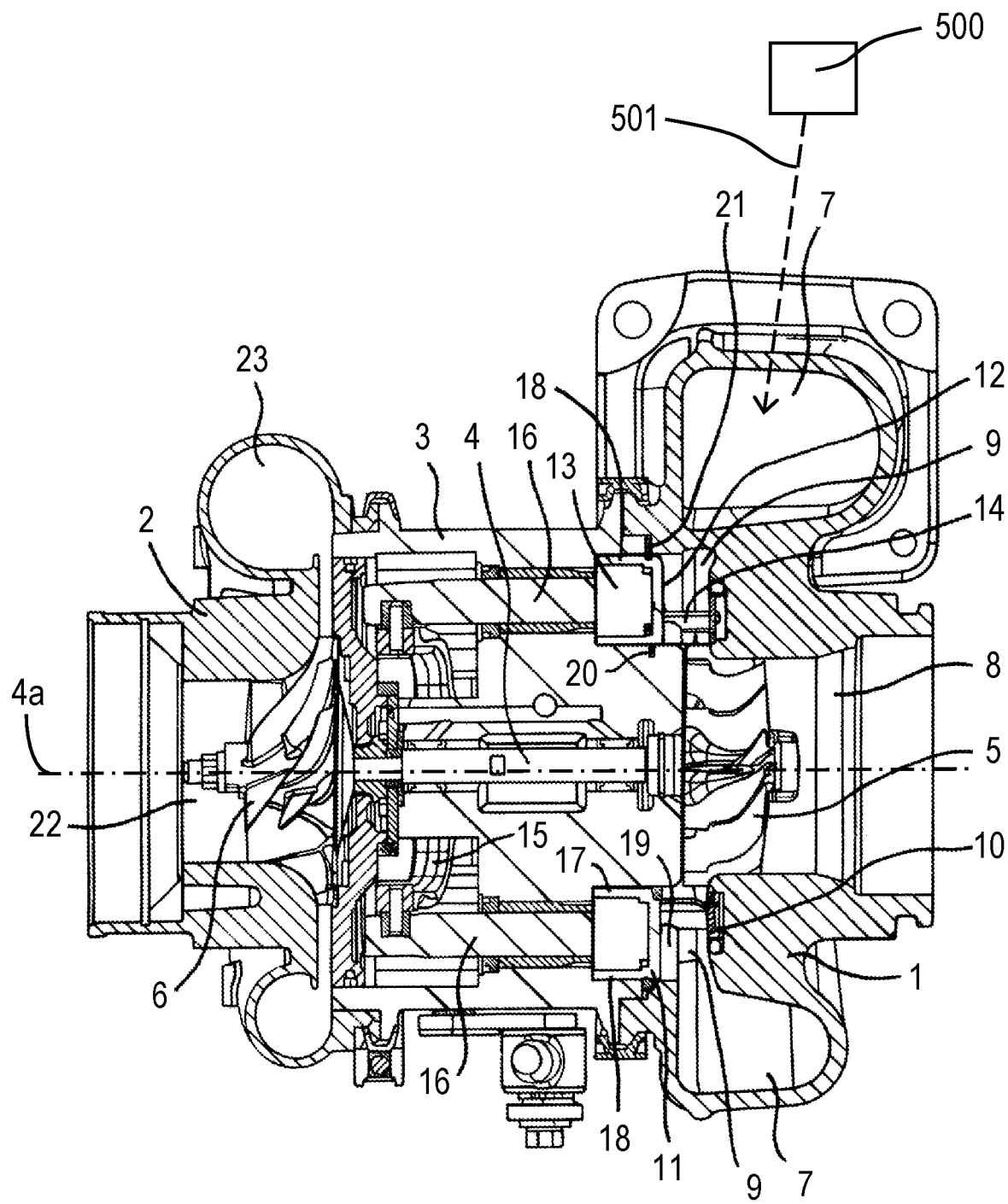
FIG. 1 shows a cross-sectional view of a turbocharger.

Referring to FIG. 1, this illustrates a variable geometry turbocharger comprising a variable geometry turbine housing 1 and a compressor housing 2 interconnected by a central bearing housing 3. A turbocharger shaft 4 extends from the turbine housing 1 to the compressor housing 2 through the bearing housing 3. A turbine wheel 5 is mounted on one end of the shaft 4 for rotation within the turbine housing 1, and a compressor wheel 6 is mounted on the other end of the shaft 4 for rotation within the compressor housing 2. The shaft 4 rotates about turbocharger axis 4*a* on bearing assemblies located in the bearing housing 3.

The turbine housing 1 defines an inlet volute 7 to which gas from an internal combustion engine 500 is delivered via an exhaust path 501 (the engine 500 and exhaust path 501 are shown schematically in FIG. 1). The exhaust gas flows from the inlet volute 7 to an axial outlet passageway 8 via an annular inlet passageway 9 and the turbine wheel 5. The inlet passageway 9 is defined on one side by a face of a radial wall of a movable annular wall member 11, comprising an annular shroud 12, and on the opposite side by a second wall member, also referred to as a nozzle ring 10, which forms the wall of the inlet passageway 9 facing the annular shroud 12. The shroud 12 defines an annular recess 13 in the annular wall member 11.

The nozzle ring 10 supports an array of circumferentially and equally spaced inlet vanes 14 each of which extends across the inlet passageway 9. The vanes 14 are orientated to deflect gas flowing through the primary inlet passageway 9 towards the direction of rotation of the turbine wheel 5. When the annular shroud 12 is proximate to the nozzle ring 10 the vanes 14 project through suitably configured slots in the shroud 12, into the recess 13.

The position of the annular wall member 11 is controlled by an actuator assembly of the type disclosed in U.S. Pat. No. 5,868,552. An actuator (not shown) is operable to adjust the position of the annular wall member 11 via an actuator output shaft (not shown), which is linked to a yoke 15. The yoke 15 in turn engages axially extending actuating rods 16 that support the annular wall member 11. Accordingly, by appropriate control of the actuator (which may for instance be pneumatic, hydraulic or electric), the axial position of the rods 16 and thus of the annular wall member 11 can be controlled. The speed of the turbine wheel 5 is dependent upon the velocity of the gas passing through the inlet passageway 9. For a fixed rate of mass of gas flowing into the inlet passageway 9, the gas velocity is a function of the width of the inlet passageway 9, the width being adjustable by controlling the axial position of the annular wall member 11. For a fixed rate of mass of gas flowing into the inlet passageway 9, up until the point at which the vanes 14 choke the inlet passageway 9 the narrower the width of the inlet passageway 9, the greater the velocity of the gas passing through the inlet passageway 9.

FIG. 1 shows the inlet passageway 9 fully open. The inlet passageway 9 may be closed to a minimum by moving the annular shroud 12 of the annular wall member 11 towards the nozzle ring 10. When the separation between the annular shroud 12 of the annular wall member 11 and the nozzle ring 10 is a minimum (such that the width of the inlet passageway is a minimum), the annular wall member 11 may be said to be in a closed position.

The annular wall member 11 has axially extending radially inner and outer annular flanges 17 and 18 that extend into an annular cavity 19 provided in the turbine housing 1. Inner and outer sealing rings 20 and 21 are provided to seal the annular wall member 11 with respect to inner and outer annular surfaces of the annular cavity 19 respectively, whilst allowing the annular wall member 11 to slide within the annular cavity 19. The inner sealing ring 20 is supported within an annular groove formed in the radially inner annular surface of the cavity 19 and bears against the inner annular flange 17 of the annular wall member 11. The outer sealing ring 20 is supported within an annular groove formed in the radially outer annular surface of the cavity 19 and bears against the outer annular flange 18 of the annular wall member 11.

Gas flowing from the inlet volute 7 to the outlet passageway 8 passes over the turbine wheel 5 and as a result torque is applied to the shaft 4 to drive the compressor wheel 6. Rotation of the compressor wheel 6 within the compressor housing 2 pressurises ambient air present in an air inlet 22 and delivers the pressurised air to an air outlet volute 23 from which it is fed to an internal combustion engine (not shown).

Figure 2:
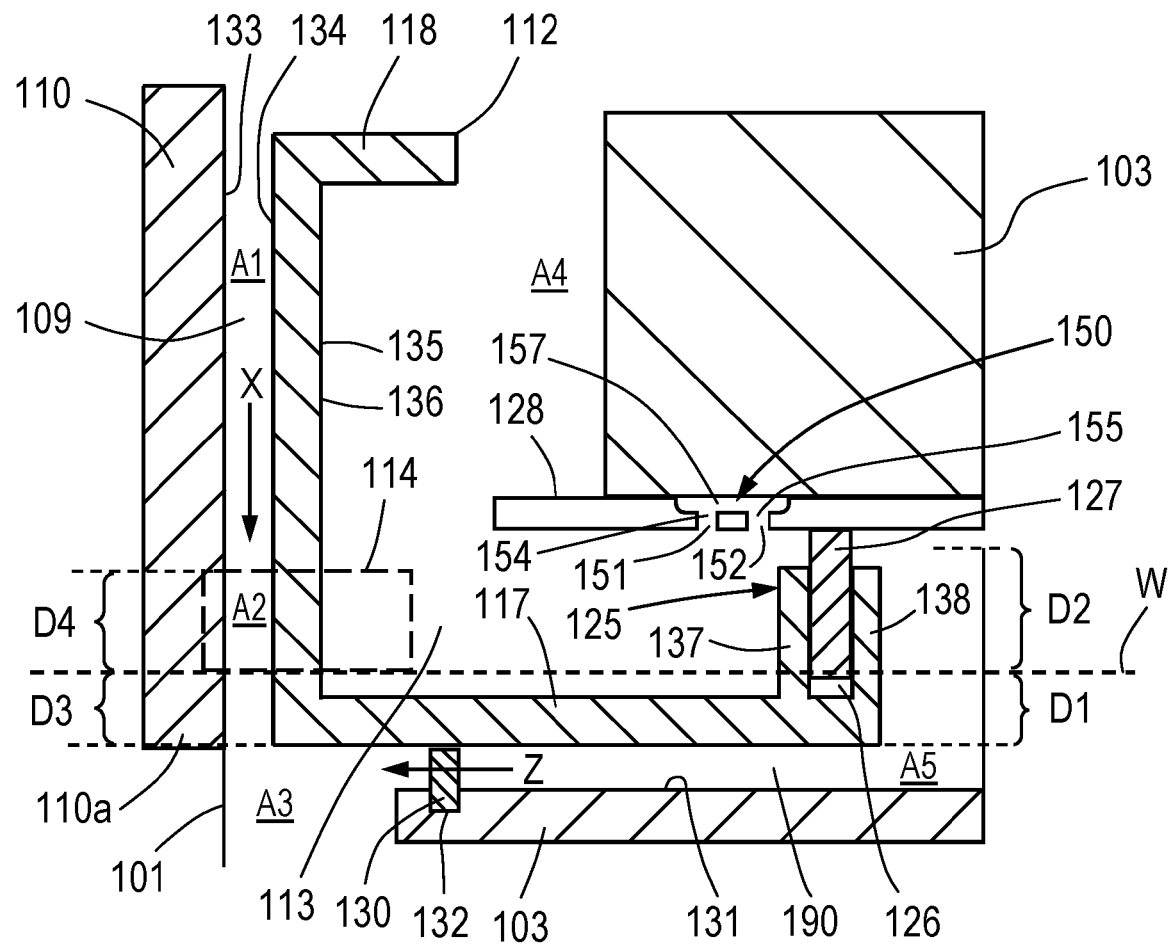
FIG. 2 shows a schematic cross-sectional view of a portion of a turbine according to a first embodiment of the present disclosure.

Referring to FIG. 2, there is shown a schematic cross-sectional view of a portion of a turbine according to a first embodiment of the present disclosure. The turbine of this embodiment is identical to the turbine of FIG. 1 except of the differences described below. Corresponding features are given the same reference numerals but incremented by 100. The turbine of this embodiment is a turbine of a turbocharger such as the turbocharger shown in FIG. 1.

In the embodiment shown in FIG. 2, the shroud 112 includes radially inner and outer axially extending annular flanges 117, 118 similar to those of the shroud 12 shown in FIG. 1. However, the outer annular flange 118 of the embodiment shown in FIG. 2 is shorter than that of the outer annular flange 18 forming part of the conventional arrangement shown in FIG. 1.

At the outboard end of the inner annular flange 117 is a radially extending flange 125 which defines an annular groove 126 for receipt of an annular split seal ring 127. The seal ring 127 is dimensioned so as to contact an adjacent, radially inner, surface of a cylindrical sleeve 128 which extends axially from the bearing housing 103 into the annular cavity 113 so as to provide a restriction to fluid flow in between the seal ring 127 and the cylindrical sleeve 128. In this regard, the contact between the seal ring 127 and the radially inner surface of the cylindrical sleeve 128 results in a substantial seal that substantially prevents fluid from passing from a region of the cavity 113 inboard of the seal ring 127, past the seal ring 127 to a position outboard of the seal ring 127 (and vice versa).

An annular primary inlet passageway 109 is defined between a radial surface 133 of the nozzle ring 110 and an opposite radial surface 134 of a radial wall 135 of the shroud 118.

As in FIG. 1, in the arrangement shown in FIG. 2, the nozzle ring 110 is fixed to the turbine housing 101. The nozzle ring 110 supports an array of circumferentially spaced inlet vanes 114, each of which extends across the primary inlet passageway 109.

The vanes 114 are oriented to deflect gas flow in the direction or arrow X through the primary inlet passageway 109 towards the direction of rotation of the turbine wheel (not shown in FIG. 2). When the annular shroud 112 is proximate to the nozzle ring 110 the vanes 114 project through suitably configured slots (not shown) in the shroud 112.

As can be seen in FIG. 2, the shroud 112 and the bearing housing 103 are arranged so as to define a path for gas flowing towards the turbine wheel to flow into the annular cavity 113 behind the shroud 112. In this way, gas can flow around the relatively short outer annular flange 118 to transmit relatively high pre-turbine pressure to the back of the shroud 112. In an alternative arrangement, the shroud 112 may incorporate a relatively long outer annular flange which can be sealed with respect to the bearing housing 103 by a seal ring and a plurality of apertures defined by the shroud upstream of the outer diameter of the vane passage to facilitate the flow of gas at pre-turbine pressure to flow into the annular cavity 113.

A secondary inlet flow passageway 190 fluidly connects a region of the cavity 113 axially outboard of the seal ring 127 to the turbine wheel. The secondary inlet passageway 190 is arranged such that flow passing through the secondary inlet passageway 190, from the cavity 113 to the turbine wheel, bypasses the inlet vanes 114.

A bypass arrangement in the form of a plurality of circumferentially distributed bypass passages 150 is provided in the cylindrical sleeve 128. Each bypass passage 150 extends from an inlet bypass port 151 to an outlet bypass port 152, said inlet and outlet bypass ports 151, 152 being axially spaced from each other and provided in said radially inner surface of the annular sleeve 128 that is adjacent to the seal 127. Each of the inlet and outlet bypass ports 151, 152 has substantially the same axial extent as the annular seal 127.

The bypass passages 150 are distributed in the circumferential direction and are substantially axially aligned with each other.

Each bypass passage 150 comprises an inlet passage 154 that fluidly connects the bypass inlet port 151 to a bypass chamber 157 and an outlet passage 155 that fluidly connects the bypass chamber to the outlet bypass port 152. The outlet bypass port 152 is spaced axially from the inlet bypass port 151 in the axially outboard direction.

The bypass chamber 157 extends in the axial direction partway along the axial length of the annular sleeve 128. The bypass chamber 157 also extends in the circumferential direction partway along the circumference of the annular sleeve 128.

Figure 6:
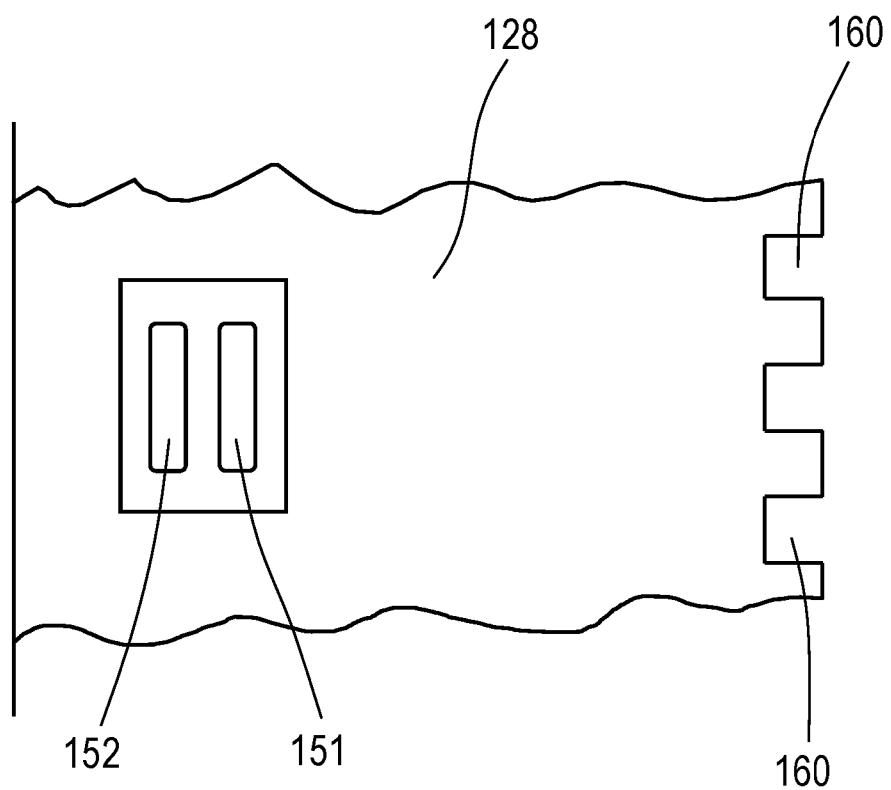
FIG. 6 shows an under plan view of a circumferential section of an annular sleeve of the portion of the turbine shown in FIGS. 4a to 4d.

Similarly, the inlet and outlet bypass ports 151, 152 have an annular cross-sectional shape, extending in the circumferential direction partway along the circumference of the radially inner surface of the sleeve 128 (see FIG. 6). Accordingly, the inlet and outlet bypass ports 151, 152, the inlet and outlet passages 154, 155 and the bypass chamber 157 are each annular extending in the circumferential direction partway along the circumference of the annular sleeve 128.

As described in more detail below, the bypass passage 150 and the annular seal 127 are arranged such that as the shroud 112 moves axially, the annular seal 127 moves axially relative to the inlet and outlet bypass ports 151, 152, so as to vary the extent of flow that may pass from a region of the cavity 113 inboard of the annular seal 127, through the bypass passage 150, to the secondary inlet passageway 190.

Referring again to FIG. 2, a further split seal ring 130 is provided between the inner annular flange 117 and an axially extending wall 131 of the bearing housing 103 that, in part, defines the annular cavity 113 within which the shroud 112 is mounted.

In the embodiment shown in FIG. 2 the wall 131 defines an annular groove 132 for receipt of the seal ring 130 such that the inner annular flange 117 of the shroud 112 runs over the radially outer edge of the seal ring 130 during axial displacement of the shroud 112. The radial extent of the seal ring 130 is selected to define a predetermined radial clearance between the seal ring 130 and the inner annular flange 117. This sealing arrangement is configured so as to define a leakage flow path across the seal ring 130, from inboard of the seal ring 130 to outboard of the seal ring 130 so that said secondary inlet passageway 190 is in fluid communication with the turbine wheel.

In an alternative embodiment, the seal ring 130 may be omitted.

Specifically, referring to FIGS. 3a to 3d, there is sequentially shown schematic cross-sectional views corresponding to that of FIG. 2, but where the movable shroud 112 is moved progressively closer to the facing radial surface 133 of the radial wall of the nozzle ring 110.

Figure 3A:
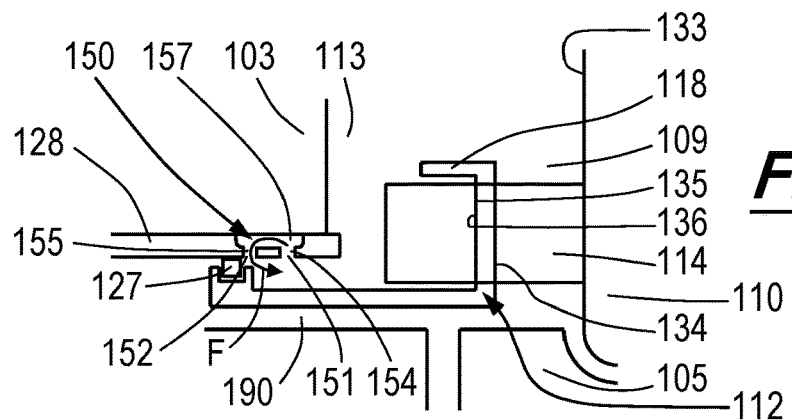
FIG. 3a shows a schematic cross-sectional view corresponding to that of FIG. 2, where the movable shroud is in a third axial position relative to a facing wall of a housing of the turbine.

In more detail, in FIG. 3a the movable shroud 112 is in a third position relative to the facing radial surface 133 of the nozzle ring 110. In this position, the radially extending flange 125 is axially positioned such that the annular seal 127 is disposed axially outboard of the outlet port 152 of the bypass passageway 150. In this respect, the axially inboard and outboard sides of the annular seal 127 are disposed axially outboard of the outlet port 152. When the seal 127 is in this third position, flow is substantially prevented from passing from a region of the cavity 113 inboard of the seal 127 to a region of the cavity 113 outboard of the seal 127 and therefore is substantially prevented from passing to the secondary inlet passageway 190. Accordingly, flow is substantially prevented from bypassing the primary inlet passageway 109, and therefore from bypassing the vanes 114 (the path of the flow is shown by the arrow F).

When the movable shroud 112 is in the third position, it may occupy any axial position in which it substantially covers the outlet bypass port 152, or is disposed axially outboard of the outlet bypass port 152 such that it substantially prevents flow passing from the bypass passage 150 to axially outboard of the seal 127, to the secondary inlet passageway 190. In this third position, the seal 127 may partially cover the outlet port 152, with an outboard side of the seal 127 disposed axially outboard of the outboard side of the outlet port 152, such that flow is substantially prevented from passing from the outlet port 152 to axially outboard of the seal 127.

Figure 3B:
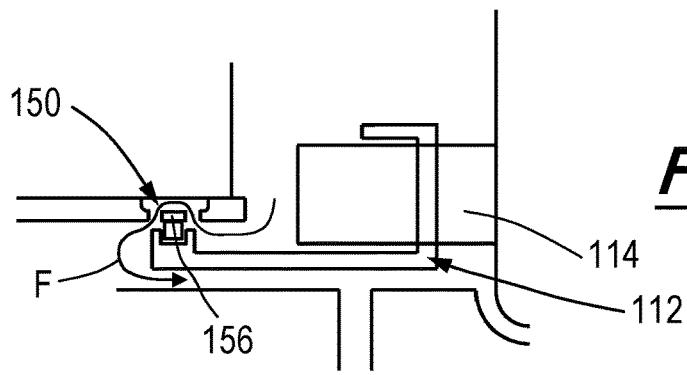
FIG. 3b shows a schematic cross-sectional view corresponding to that of FIG. 2, where the movable shroud is in a first axial position relative to a facing wall of a housing of the turbine.

Referring to FIG. 3b, the movable shroud 112 is shown in a first axial position relative to the facing surface 133 of the nozzle ring 110. When the shroud 112 is in this axial position, the radially extending flange 125 and the annular seal 127 are axially located between the inlet and outlet ports 151, 152 of the bypass passage 150, such that the inlet and outlet ports 151, 152 are at least partially exposed so as to allow flow to pass from the region of the cavity 113 inboard of the seal 127, through the bypass passage 150 to the secondary inlet passageway 190 and to the turbine wheel 105, thereby bypassing the primary inlet passageway 109 and therefore the inlet guide vanes 114 (the path of the flow is shown by the arrow F).

Figure 3C:
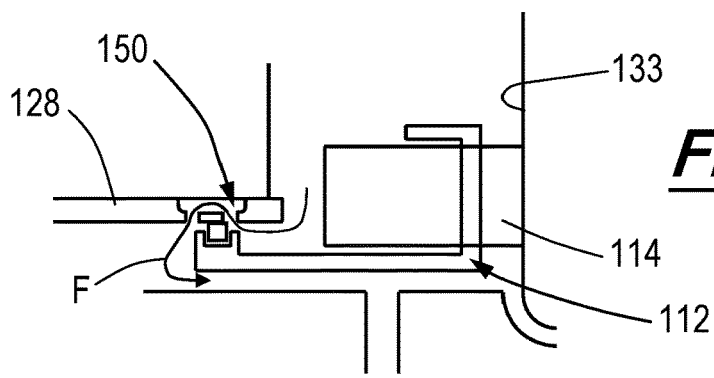
FIG. 3c shows a schematic cross-sectional view corresponding to that of FIG. 2, where the movable shroud is in a first axial position relative to a facing wall of a housing of the turbine but located axially inboard of the position shown in FIG. 3b.

Similarly, in FIG. 3c the seal 127 is also shown in an alternative first axial position in which the seal 127 is disposed slightly axially inboard of its position shown in FIG. 3b. In the position shown in FIG. 3c, the inlet port 151 is partially covered by the seal 127 and the outlet port 152 is entirely exposed, with the seal 127 disposed axially inboard of the outlet port 152. The inlet port 151 is exposed to a sufficient extent to allow flow to pass from the region of the cavity 113 inboard of the seal 127, through the inlet port 151, through the bypass port 150 to the secondary inlet port 157, and to the turbine wheel 150, thereby bypassing the primary inlet passageway 109 and the inlet guide vanes 114.

It will be appreciated that when the shroud 112 is in its first position it may occupy a range of axial positions in which it is disposed between the inlet and outlet ports 151, 152 such that it does not cover, or only partially covers, the inlet and/or outlet bypass ports 151, 152 such that flow may pass from the cavity 113, through the bypass passage 150 to the secondary inlet passage 157.

Figure 3D:
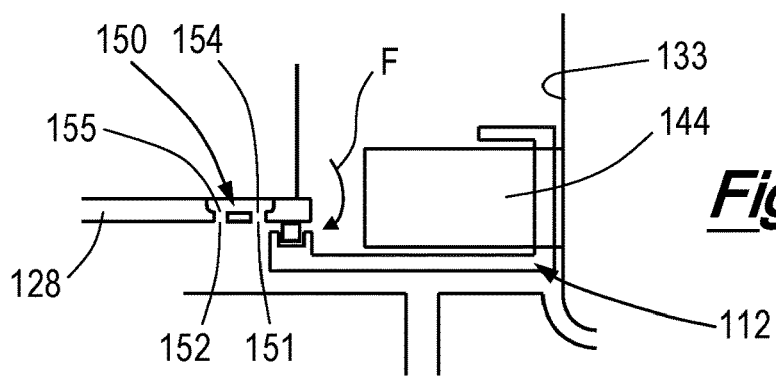
FIG. 3d shows a schematic cross-sectional view corresponding to that of FIG. 2, where the movable shroud is in a second axial position relative to a facing wall of a housing of the turbine.

Referring to FIG. 3*d*, the shroud 112 is shown in a second axial position. When the shroud is in the second axial position it is disposed axially inboard of its position when it is in the third axial position (shown in FIGS. 3*b* and 3*c*). In this regard, when the shroud 112 is in the third axial position the annular seal 127 is disposed axially inboard of its position when the shroud 112 is in the third axial position.

When the shroud 112 is in the second axial position, it is disposed axially inboard of the inlet port 151 of the bypass passage 150. In this regard, the axially inboard and outboard sides of the seal 127 are disposed axially inboard of the inlet port 151 of the bypass passage 150. In this position, the seal 127 substantially prevents flow from passing from the cavity 113 past the seal 127, to the secondary inlet passageway 190. It will be appreciated that in this position, no flow passes from the cavity 113 through the bypass passage 150.

When the shroud 112 is in the second axial position, the seal 127 may be axially located such that it substantially covers, or at least partially covers, or is disposed axially inboard of, the inlet bypass port 151 of the bypass passage 150, such that flow may not pass from the region of the cavity 113 inboard of the seal 127 to the secondary inlet passageway 190. Accordingly, it will be appreciated that when the movable shroud 112 is in the second axial position, it may occupy a range of axial positions.

Accordingly, the movable shroud 112 is axially movable relative to the facing wall 133 of the nozzle ring 110, between first and second configurations, wherein in the first configuration the seal 127 is positioned relative to the inlet and outlet bypass ports 151, 152 such that flow may pass from a region of the cavity 113 inboard of the seal 127 to the secondary inlet passageway 190, via the bypass passage 150 and in the second configuration the seal 127 is positioned relative to the inlet and outlet bypass ports 151, 152 such that flow is substantially prevented from passing from the region of the cavity 113 inboard of the seal 127 to the secondary inlet passageway 190, via the bypass passage 150.

When the shroud 112 is in the first configuration it is in the first axial position. When the shroud 112 is in the second configuration it is in the second or third axial positions.

The bypass arrangement of the above described embodiment is advantageous in that the axial position of the movable shroud 112 determines the level of bypass flow, i.e. the amount of flow that passes from a region of the cavity 113 inboard of the seal 127, along the secondary inlet passageway 190 to the turbine wheel. The bypass flow provides a reduction in efficiency of the turbine since the bypass flow does less work than the exhaust gas flow through the primary inlet passageway 109 to the turbine wheel. In this regard, the flow through the primary inlet passageway 109 is turned in a tangential direction by the vanes 114, causing the flow to do more work. Accordingly, the bypass flow causes a reduction in efficiency of the turbine and a corresponding drop in compressor outflow pressure, with an accompanying drop in engine cylinder pressure.

The axial position of the inlet and outlet bypass ports 151, 152 may be selected to provide a reduction in efficiency at certain axial positions of the movable wall member (i.e. at a certain width of the inlet passageway) such that, during exhaust gas heating and/or thermal regeneration, the high boost pressures that would otherwise be achieved at small inlet widths are reduced. This prevents an increase in the airflow to the engine, that would offset the effect of the restriction and thus reduce the desired heating effect. Accordingly, the above bypass arrangement may allow for improved exhaust gas heating and/or thermal regeneration.

Furthermore, the axial position of the inlet and outlet bypass ports 151, 152, may be selected to provide a reduction in efficiency at certain axial positions of the movable shroud 112 (i.e. at a certain width of the inlet passageway) such that, during engine braking the high boost pressures that would otherwise be achieved at small inlet widths are reduced. This avoids the cylinder pressures approaching, or exceeding, acceptable limits. Accordingly, the above bypass arrangement may allow for improved engine braking.

Since the extent of the bypass flow is varied in dependence on the axial position of the movable shroud 112, the reduction in efficiency is varied in dependence on the axial position of the movable shroud 112.

Providing a bypass passage 150 having inlet and outlet bypass ports 151, 152 that are axially spaced from each other in this way allows the level of bypass flow to be controlled to a greater extent than would otherwise be possible.

In this regard, where the bypass passage 150 is provided in the sleeve 128 and the seal 127 is mounted to the movable shroud 112, as the movable shroud 112 moves inboard, from a fully open position, the seal 127 moves inboard of the outlet bypass port 152, thereby 'opening' the outlet bypass port 152, i.e. allowing flow to pass from a region of the cavity inboard of the sea 127, through the bypass inlet port 151 through the bypass passage 150 and out of the bypass outlet port 152 to the secondary inlet passageway. Once the outboard side of the seal 127 passes the inboard side of the outlet bypass port 152, the outlet bypass port 152 is fully 'opened'. This is the position shown in FIG. 3. In this position, the amount of bypass flow is at a maximum.

As the seal 127 continues to move inboard relative to the inlet and outlet bypass ports 151, 152, it then begins to 'close' the inlet bypass port 151, i.e. reducing the flow that can pass through the inlet bypass port 151 into the bypass passage 150.

Accordingly, this allows the level of bypass flow to be controlled, after the outlet port 152 has been fully opened, in dependence on the axial position of the movable shroud 112, as the movable shroud 112 moves inboard.

This is particularly advantageous since, in some situations, it is desirable to increase the level of bypass flow to a maximum, for a certain axial position of the movable shroud 112 (i.e. a certain width of the inlet passageway) and then to decrease it again as the movable shroud 112 moves inboard from this position, i.e. as the width of the inlet passageway is reduced. For example, during engine braking it may be desirable to reduce the level of bypass flow at a very small width of the inlet passageway, so as to allow for sufficient back pressure for engine braking to occur.

Furthermore, by varying the axial separation of the inlet and outlet bypass ports 151,152, the level of bypass flow may be "tuned" to specific operating conditions, i.e. by providing the desired levels of bypass flow at each axial position of the movable shroud 112.

In addition, the cross sectional area and axial position of the inlet port 151 can be selected to control the level of bypass flow at certain axial positions of the movable shroud 112.

Furthermore, the bypass arrangement removes the need for a bypass valve, such as a wastegate valve, that would otherwise be needed to vary the efficiency of the turbine. Such a valve would require a large and costly actuator to operate the valve. The above arrangement therefore removes the need for any such valve or actuator.

In addition, providing the inlet and outlet bypass ports 151, 152 in the same surface advantageously provides a relatively compact bypass arrangement, as it is not necessary for the bypass passageway 150 to pass through the radial thickness of the sleeve 128, i.e. with the bypass passage extending in the radial direction, between inlet and outlet ports provided on radially inner and outer surfaces of the sleeve 128.

Referring to FIGS. 4a to 4d, there is shown a schematic cross-sectional view of a portion of a turbine according to a second embodiment of the present disclosure, where the shroud 112 is progressively moved towards the facing radial surface 133 of the nozzle ring 110. The turbine of the second embodiment is identical to that of the first embodiment, except for the differences described below. Corresponding features are given the same reference numerals.

The second embodiment differs from the first embodiment in that the bypass passage 150 is located at a position axially outboard of its position in the first embodiment. In addition, a second bypass arrangement in the form of an array of annular bypass slots 160 is provided at an axially inboard end of the sleeve 128. The slots 160 are distributed in the circumferential direction (see FIG. 6).

Each slot 160 extends in the axial direction part way along the axial extent of the annular sleeve 128. Each slot 160 extends through the radial thickness of the sleeve 128 such that its radially outer end is in gas communication with the cavity. Each slot 160 extends axially inboard to the axially inboard end of the sleeve 128 such that the sleeve 128 has an open inboard end. Accordingly flow is able to pass from the cavity 113 through the open end of the sleeve 128 into the slot 160. The slot 160 extends in a circumferential direction partly along the circumference of the annular sleeve 128 (as shown in FIG. 6).

The movable shroud 112 is moved to corresponding positions to those as described for the first embodiment. In this regard, in FIG. 4a the movable shroud 112 is in said third position relative to the facing radial surface 133 of the nozzle ring 110. In this position, the radially extending flange 125 is axially positioned such that the annular seal 127 is disposed axially outboard of the outlet port 152 of the bypass passageway 150. In this respect, the axially inboard and outboard sides of the annular seal 127 are disposed axially outboard of the outlet port 152. When the seal 127 is in this third position, flow is substantially prevented from passing from a region of the cavity 133 inboard of the seal 127 to the secondary inlet passageway 190—i.e. to a region of the cavity 113 outboard of the seal 127. Accordingly, flow is substantially prevented from bypassing the vanes 114.

When the movable shroud 112 is in the third position, it may occupy any axial position in which it substantially covers the outlet bypass port 152, or is disposed axially outboard of the outlet bypass port 152 such that it substantially prevents flow passing from the bypass passage 150 to axially outboard of the seal 127, to the secondary inlet passageway 190. In this third position, the seal 127 may partially cover the outlet port 152, with an outboard side of the seal 127 disposed axially outboard of the outboard side of the outlet port 152, such that flow is substantially prevented from passing from the outlet port 152 to axially outboard of the seal 127.

Figure 4A:
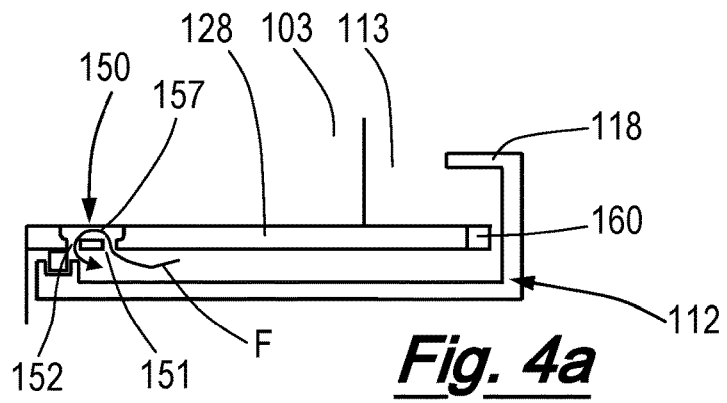
FIG. 4a shows a schematic cross-sectional view of a portion of a turbine according to a second embodiment of the present disclosure, where the movable shroud is in a third axial position relative to a facing wall of a housing of the turbine.
Figure 4B:
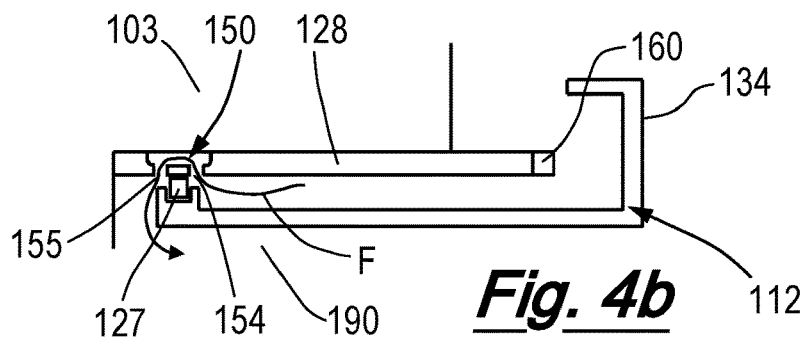
FIG. 4b shows a schematic cross-sectional view corresponding to that of FIG. 4a, where the movable shroud is in a first axial position relative to a facing wall of a housing of the turbine.

Referring to FIG. 4b, the shroud is shown in said second axial position. In this position, the seal 127 is axially located between the inlet and outlet ports 151, 152 of the bypass passage 150, such that the inlet and outlet ports 151, 152 are substantially completely exposed so as to allow flow to pass from a region of the cavity 113 inboard of the seal 127, through the bypass passage 150 to the secondary inlet passageway 190 and to the turbine wheel 105, thereby bypassing the inlet guide vanes 114.

As with the first embodiment, when the shroud 112 is in the first position it may occupy a range of axial positions in which it is disposed between the inlet and outlet ports 151, 152 such that it does not cover, or only partially covers, the inlet and/or outlet bypass ports 151, 152, such that the flow may pass from a region of the cavity 113 inboard of the seal 127, through the bypass passage 150 to the secondary inlet passage 157.

Figure 4C:
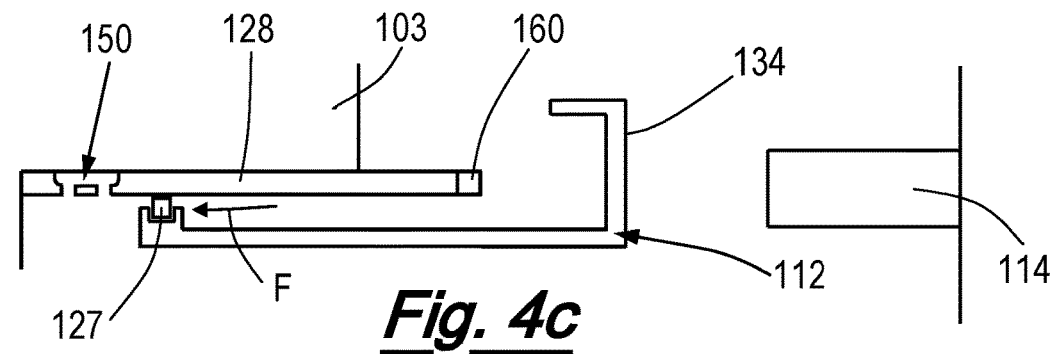
FIG. 4c shows a schematic cross-sectional view corresponding to that of FIG. 4a, where the movable shroud is in a second axial position relative to a facing wall of a housing of the turbine.

Referring to FIG. 4c, the shroud 112 is shown in said second axial position. In this position, the annular seal 127 is disposed axially inboard of its position when the shroud 112 is in the third axial position.

When the shroud 112 is in the second axial position, it is disposed axially inboard of the inlet port 151 of the bypass passage 150. In this regard, the axially inboard and outboard sides of the seal are disposed axially inboard of the inlet port 151 of the bypass passage 150. In this position, the seal substantially prevents flow from passing from a region of the cavity 113 inboard of the seal 127, past the seal 127 to the secondary inlet passageway 190.

When the shroud 112 is in the second axial position, the seal 127 may be axially located such that it substantially covers, or at least partially covers, or is disposed axially inboard of, the inlet bypass port 151 of the bypass passage 150, such that flow may not pass from the region of the cavity 113 inboard of the seal 127 to the secondary inlet passageway 190. Accordingly, it will be appreciated that when the movable shroud 112 is in the second axial position, it may occupy a range of axial positions.

As with the first embodiment, the axial position of the inlet and outlet bypass ports 151, 152 of the bypass passage 150 may be selected to provide a reduction in efficiency at certain axial positions of the movable wall member (i.e. at a certain width of the inlet passageway) to provide improved exhaust gas heating and thermal regeneration, or improved engine braking.

Figure 4D:
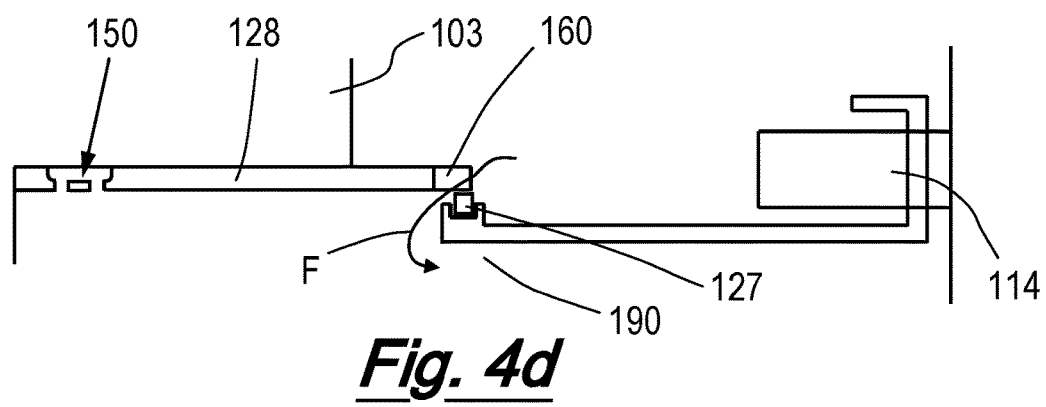
FIG. 4d shows a schematic cross-sectional view corresponding to that of FIG. 4a, where the movable shroud is in a fourth axial position relative to a facing wall of a housing of the turbine.

Referring to FIG. 4d, the shroud 112 is shown in a fourth axial position. When the shroud 112 is in the fourth axial position, it is disposed axially inboard of its position when it is in the third axial position. When the shroud 112 is in the fourth axial position, the seal 127 is disposed such that its axially outboard end is located axially inboard of the axially outboard end of the slot 160. Accordingly, flow is able to pass from a region of the cavity 113 inboard of the recess 160, through the slot 160 past the seal 127 to a region of the cavity 113 inboard of the seal 127, through the secondary inlet passageway 157, to the turbine wheel, thereby bypassing the inlet guide vanes 114.

When the shroud 112 is in the first configuration it is in the first axial positions. When the shroud 112 is in the second configuration it is in the second or third axial positions.

The shroud 112 may be axially movable relative to the facing wall of the nozzle ring, between third and fourth configurations, wherein in the third configuration the seal is positioned relative to the second bypass feature, in this embodiment the recess 160, such that flow may pass from a region of the cavity 113 inboard of the seal 127 to the secondary inlet passageway 190, through the bypass flow path of the second bypass feature and in the fourth configuration the seal 127 is positioned relative to the second bypass feature such that flow is substantially prevented from passing from the region of the cavity 113 inboard of the seal 127 to the secondary inlet passageway 190, via the bypass flow path.

When the shroud 112 is in the third configuration it is in the fourth axial position. When the shroud is in the fourth configuration it is in the second axial position.

In this embodiment, the axial position of the inlet and outlet bypass ports 151, 152 of the bypass passage 150 are selected to provide a reduction in efficiency at certain axial positions of the movable wall member (i.e. at a certain width of the inlet passageway) to provide improved exhaust gas heating and/or thermal regeneration.

The axial position of the slot 160 may be selected to provide a reduction in efficiency at certain axial positions of the movable wall member (i.e. at a certain width of the inlet passageway) to provide improved engine braking.

The axial positions of the movable shroud 112 during exhaust gas heating and/or thermal regeneration are outboard of the axial positions of the movable shroud 112 during engine braking, i.e. the width of the inlet passageway 109 is greater during exhaust gas heating and/or thermal regeneration than during engine braking. During engine braking the movable shroud 112 may be moved to a position in which the width of the inlet passageway 109 is a minimum, which may be zero, with the radial wall of the movable shroud 112 abutting the facing wall 133 of the housing.

Referring to FIGS. 5A to 5H, there is shown a schematic cross-sectional view of a portion of a turbine according to a third embodiment of the present disclosure, where the shroud 112 is progressively moved towards the facing radial surface 133 of the nozzle ring 110. The turbine of the third embodiment is identical to that of the second embodiment, except for the differences described below. Corresponding features are given the same reference numerals.

The third embodiment differs from the second embodiment in that each bypass recess 160 is replaced with a second bypass passage 170. In this regard, each bypass passage 150 forms a first bypass passage and each bypass passage 170 forms a second bypass passage. The second bypass passage 170 is disposed axially inboard of the first bypass passage 150 and is located slightly axially outboard of the end of the annular sleeve 128. The second bypass passages 170 are distributed in the circumferential direction and are substantially axially aligned with each other.

Each second bypass passage 170 is substantially identical in structure to each first bypass passage 150. In this regard, each second bypass passage 170 extends from an inlet bypass port 171 to an outlet bypass port 172, said inlet and outlet bypass ports 171, 172 being axially spaced from each other and provided in the surface of the annular sleeve 128 that is adjacent to the seal 127. Each of the inlet and outlet bypass ports 171, 172 have substantially the same axial extent than the annular seal 127.

Each second bypass passage 170 comprises an inlet passage 174 that fluidly connects the inlet port 171 to a bypass chamber 177 and an outlet passage 175 that fluidly connects the bypass chamber 177 to the outlet bypass port 172. The outlet bypass port 172 is spaced axially from the inlet bypass port 171 in the axially outboard direction.

The bypass chamber 177 extends in the axial direction part way along the axial length of the annular sleeve 128. The bypass chamber 177 also extends in the circumferential direction part way along the circumference of the annular sleeve 128.

As with the second embodiment, the shroud 112 is movable to said third, first and second positions relative to the facing radial surface 133 of the nozzle ring 110, as shown in FIGS. 5A, 5B and 5C (FIGS. 5B and 5C show different axial positions of the shroud 112 in which it is in said first position) and FIG. 5D, respectively. The positions correspond to those shown in FIGS. 4A, 4B and 4C, respectively.

Referring to FIG. 5e, the movable shroud 112 is shown in a sixth axial position relative to the facing radial surface 133 of the nozzle ring 110. In this position, the annular seal 127 is disposed axially inboard of when it is in the second axial position.

In the sixth position, the radially extending flange 125 is axially positioned such that the annular seal 127 is disposed such that it partially overlaps the outlet port 172 of the second bypass passage 170, with the axially outboard side of the seal 127 being disposed axially outboard of the axially outboard side of the outlet port 172. In this regard, flow is substantially prevented from passing from a region of the cavity 113 inboard of the seal 127, to a region of the cavity 113 outboard of the seal 127. And therefore to the secondary inlet passageway 190. Accordingly, flow is substantially prevented from bypassing the guide vanes 114.

When the movable shroud 112 is in the sixth position, it may occupy any axial position in which it substantially covers the outlet bypass port 172, or is disposed axially outboard of the outlet bypass port 172 such that it substantially prevents flow passing from the bypass passage 170 to axially outboard of the seal 127, to the secondary inlet passageway 190. In this sixth position, the seal 127 may partially cover the outlet port 172, with an outboard side of the seal 127 disposed axially outboard of the outboard side of the outlet port 172, such that flow is substantially prevented from passing from the outlet port 172 to axially outboard of the seal 127.

Referring to FIG. 5F, the movable shroud 112 is shown in a fourth axial position. When the shroud 112 is in this axial position, the radially extending flange 125 is located such that the annular seal 127 is axially located between the inlet and outlet ports 171, 172 of the second bypass passage 170, such that the inlet and outlet ports 171, 172 are substantially completely exposed so as to allow flow to pass from a region of the cavity 113 inboard of the seal 127, through the second bypass passage 170 to the secondary inlet passageway 190 and to the turbine wheel 105, thereby bypassing the inlet guide vanes 114.

Similarly, in FIG. 5G the seal 127 is shown in an alternative fourth axial position, in which the seal 127 is disposed slightly axially inboard of its position shown in FIG. 5F. In the position shown in FIG. 5G, the inlet port 171 is partially covered by the seal 127 and the outlet port 172 is entirely exposed, with the inlet seal 127 disposed axially inboard of the outlet port 172. The inlet port 171 is exposed to a sufficient extent to allow flow to pass from a region of the cavity 113 axially inboard of the seal 127, through the inlet port 171, through the second bypass passage 170, out through the outlet port 172 to the secondary inlet passage 170.

It will be appreciated that when the shroud 112 is in the fourth position, it may occupy a range of axial positions in which it is disposed between the inlet and outlet ports 171, 172 such that it does not cover, or only partially covers, the inlet and/or outlet bypass ports 171, 172 such that flow may pass from a region of the cavity 113 inboard of the seal 127, through the bypass passage 170 to the secondary inlet passage. 170

Referring to FIG. 5h, the movable shroud 112 is shown in a fifth axial position. In the fifth axial position, the movable shroud 112 is axially located such that the annular seal 127 is disposed axially outboard of the inlet port 171 of the second bypass passage 170. In this respect, the axially inboard and outboard ends of the seal 127 are disposed axially outboard of the outboard end of the inlet port 171.

When the shroud 112 is in the fifth axial position, it is disposed axially inboard of the inlet port 171 of the second bypass passage 170. In this regard, the axially inboard and outboard sides of the seal 127 are disposed axially inboard of the inlet port 171 of the second bypass passage 170. In this position, the seal 127 substantially prevents flow from passing from a region of the cavity 113 inboard of the seal 127, past the seal 127, to the secondary inlet passageway 190. It will be appreciated that in this position, no flow passes from the region of the cavity 113 inboard of the seal 127 through the bypass passage 170. Accordingly, no flow bypasses the inlet guide vanes 114.

When the shroud 112 is in the fifth axial position, the seal 127 may be axially located such that it substantially covers, or at least partially covers, or is disposed axially inboard of, the inlet bypass port 171 of the second bypass passage 170, such that flow may not pass from the region of the cavity 113 inboard of the seal 127 to the secondary inlet passageway 190. Accordingly, it will be appreciated that when the movable shroud 112 is in the fifth axial position, it may occupy a range of axial positions.

When the shroud 112 is in the first configuration it is in the first axial position. When the shroud 112 is in the second configuration it is in the second or third axial positions.

When the shroud 112 is in the third configuration it is in the fourth axial position. When the shroud is in the fourth configuration it is in the fifth or sixth axial positions.

In an exhaust gas heating mode, the engine 500 is operated in an engine fired mode and the movable shroud 112 is moved inboard so as to close the inlet passage 109 to a minimum width less than the smallest width appropriate for normal engine operating conditions in order to control exhaust gas temperature. The basic principle of operation in such an "exhaust gas heating mode" is to reduce the amount of airflow through the engine for a given fuel supply level (whilst maintaining sufficient airflow for combustion) in order to increase the exhaust gas temperature. This has particular application where a catalytic exhaust after-treatment system is present.

In a thermal regeneration mode, the movable shroud 112 is moved inboard to close the inlet passage 109 to a minimum width less than the smallest width appropriate for normal engine operating conditions, to heat the exhaust gas to a temperature that will burn off the build-up undesirable accumulations.

The axial position of the inlet and outlet bypass ports 151, 152 of the first bypass passage 150 are selected to provide a reduction in efficiency at certain axial positions of the movable wall member (i.e. at a certain width of the inlet passageway) to provide improved exhaust gas heating and/or thermal regeneration.

In use, the movable shroud 112 is moved between said first and second configurations when the engine system is operated in a thermal regeneration mode or an exhaust gas heating mode.

In an engine braking mode, no fuel is supplied to the engine 500 for combustion and the inlet passage 109 is reduced to smaller areas compared to those in a normal engine fired mode operating range. In this respect, the movable shroud 112 is moved inboard "close" the turbine inlet passage 109 to a minimum flow area. In a "fully closed" position in an engine braking mode the movable shroud 112 may in some cases about the facing wall 133 of the inlet passage.

The axial positions of the movable shroud 112 during exhaust gas heating and/or thermal regeneration are outboard of the axial positions of the movable shroud 112 during engine braking, i.e. the width of the inlet passageway 109 is greater during exhaust gas heating and/or thermal regeneration than during engine braking.

The axial position of the inlet and outlet bypass ports 171, 172 of the second bypass passage 170 are selected to provide a reduction in efficiency at certain axial positions of the movable wall member (i.e. at a certain width of the inlet passageway) to provide improved engine braking.

In use, the movable shroud 112 is moved between said third and fourth configurations when the engine system is operated in an engine braking mode.

Figure 7:
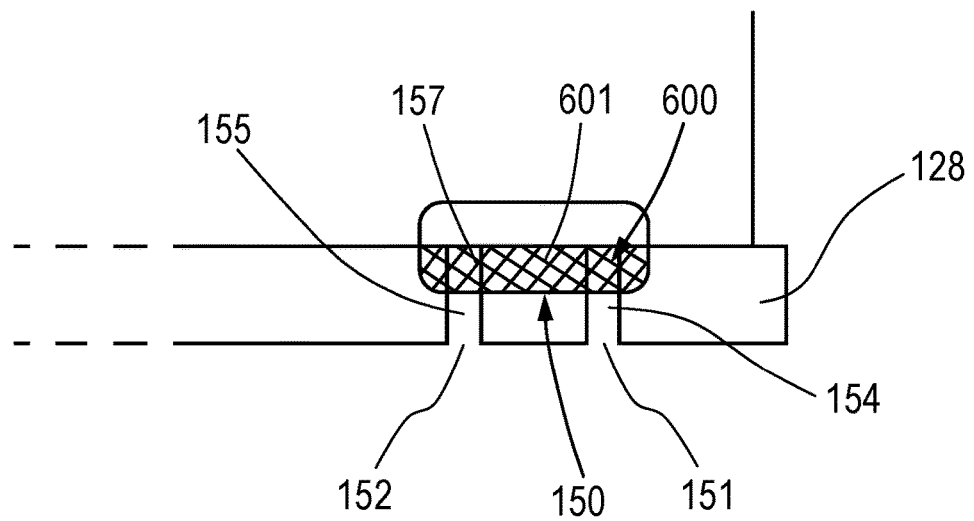
FIG. 7 shows an enlarged cross-sectional schematic view of the bypass passage shown in FIG. 2, where a filter is included in the bypass passage.

Referring to FIG. 7 there is shown an enlarged schematic axial cross-sectional view of the bypass passage 150 shown in FIG. 2 where a particulate filter 600 is disposed in the bypass passage 150.

The particulate filter 600 comprises a block 601 of DPF material. The block 601 of DPF material captures particulate matter flowing through the bypass passage 150 and then facilitates oxidation of the particulate matter to relatively harmless gaseous carbon dioxide and water while the temperature within the DPF block 601 is sufficiently high (e.g. 200° C. and above) to support the oxidation process. In certain applications it is envisaged that during operation of the turbine the DPF material will almost always be at a sufficiently high temperature to enable the oxidation process to take place. In such applications it is envisaged that the DPF catalyst will be continually converting particulate matter to gaseous carbon dioxide and water, which can then easily flow out of the bypass passage 150, past the turbine wheel and out of the turbocharger outlet, thereby avoiding the potentially deleterious effects of the build-up of particulate deposits within the turbine.

The block 601 of DPF material comprises a silicon carbide honeycomb scaffold with a layer of platinum and a base metal catalyst deposited on the scaffold. It will be appreciated that this is only one example of a material that could be employed. Other suitable catalytic materials could be based on a Corning cordierite, incorporating different loadings of platinum and base metal oxides, sintered metal materials, or filters incorporating metal foil substrates such as the diesel-oxycat filter marketed by Bosal (UK) Ltd which incorporates a stacked corrugated metal flow substrate. Moreover, the catalytic material may incorporate one or more alkali metal (e.g. potassium, caesium etc), alkaline earth metal (e.g. magnesium, strontium etc), transition metal, lanthanide or actinide (e.g. iron, cobalt, cerium etc), or compounds (e.g. oxides, nitrates etc) or combinations thereof. For example, the DPF material may include one of more compound or alloy selected from the group consisting of $MgO$, $CeO_2$, $Co_3O_4$, $Sr(NO_3)_2$, Co—Sr, Co—Sr—K, Co—$KNO_3$—$ZrO_2$, $K_2Ti_2O_5$, Co—$ZrO_2$ and the like.

In applications where the operating temperature of the particulate filter is often likely to be sufficiently high to facilitate aerial oxidation of particulate matter, the particulate filter may not need to be provided with a catalyst, but may just include a material of sufficiently high surface area to allow aerial oxidation to take place. As and when the operational temperature of the high surface area material exceeds the combustion temperature of the particulate matter, the particulate matter retained within the high surface area material will be burned-off and oxidised to gaseous waste products which can then easily flow out of the turbine outlet. The high surface area material could be formed from any appropriate material such as wire, fibre mesh, one or more sintered powders, an iron based alloy such as stainless steel, a nickel based alloy such as a hastaloy, and/or a ceramic such as a magnesium based cordierite-like material.

The density of the material used in the particulate filter can be chosen to suit a particular application. It is envisaged that if, for example, wire mesh was to be used in a non-catalyst containing particulate filter then a density of around 20 to 50%, more preferably around 35%, wire mesh may be appropriate. If a wire or fibrous material is used the thickness and length of the material can be selected to suit a particular application. By way of example, the wire/fibre may have a thickness of up to around a few millimetres or more and may have a length of up to around 10 to 60 metres or more. Particularly preferred dimensions are a thickness of around 0.1 to 0.5 mm, still more preferably around 0.15 to 0.35 mm, and a length of around 20 to 50 m, more preferably around 30 to 40 m and most preferably around 37 m. If, for example, steel wire were used then 37 m of 0.35 mm wire would provide the filter with a surface area of around 35-45,000 $mm^2$, a volume of around 3-4,000 $mm^3$ and a weight of around 25-35 g. Such a filter may, for example, be suitable for use with a turbine wheel having a diameter of around 80-90 mm. It may be desirable to scale the physical properties of the wire/fibre used in relation to changes in the diameter of the turbine wheel to allow appropriate design of a filter for use with larger or small turbine wheel than has been used and tested previously. While the inventors do not wish to be bound by any particular theory, it is anticipated that one way to achieve this might be to scale the weight or volume of the filter material as the cube of the turbine wheel diameter and/or scale the surface area of the filter material as the square of the turbine wheel diameter. It will also be appreciated that the mechanical properties of the material for the particulate filter in a high vibration environment will be an important consideration in selecting a suitable material or combination of materials.

Figure 8A:
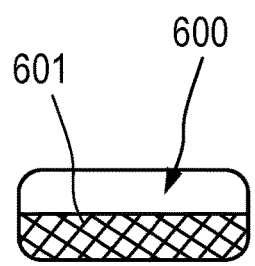
FIGS. 8a to 8c each show an enlarged view of different designs of filter that may be used in the bypass passage shown in FIG. 7.
Figure 8B:
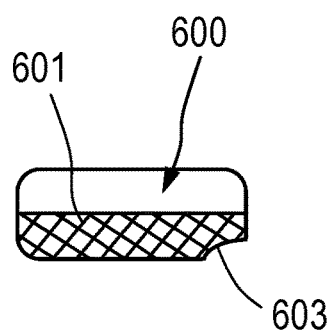

The filter 600 shown in FIG. 7 is shown in an enlarged view in FIG. 8a. FIG. 8b shows an alternative design of the filter 600, in which the block of DPF material 601 is provided with a cut-out 603 across an area where the flow from the inlet passage 154 enters the bypass chamber 157. This advantageously increases the surface area of the DPF material 601 in this region, which increases the filtering effect of the DPF material 601.

Figure 8C:
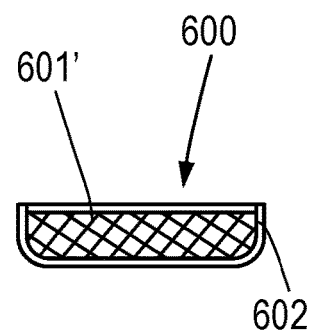

Referring to FIG. 8c there is shown a further alternative design of the filter. In this design, a stainless steel mesh 601' coated with a platinum coating is used in place of the block 601 of DPF material. The mesh 601' of DPF material is housed within a metal frame 602, that is press fit into the bypass chamber 157 (e.g. into a suitable flange surrounding the bypass chamber 157), It will be appreciated that the filter 601 of each of the designs may be mounted into the bypass chamber 157 in any suitable way.

The filter 601, 601' may additionally, or alternatively be provided in the second bypass passage 170 (as with the first bypass passage 150).

Figure 9:
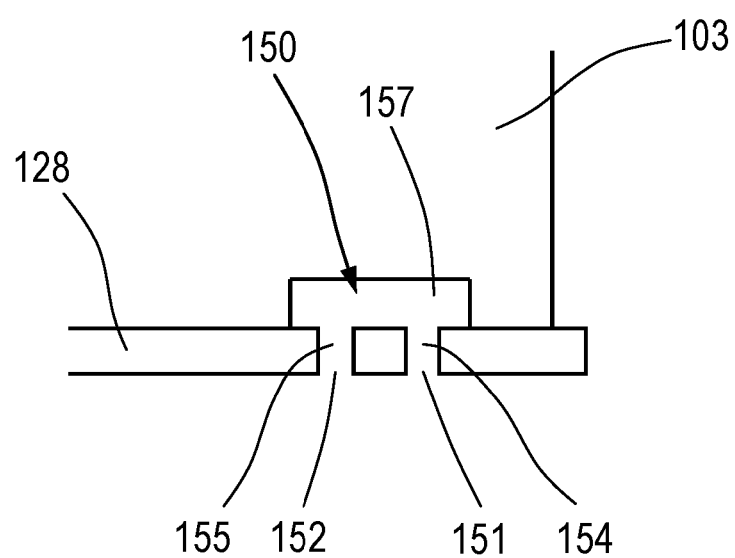
FIG. 9 shows a schematic cross-sectional view of a portion of a turbine according to a further embodiment of the present disclosure.

Referring to FIG. 9 there is shown a schematic cross-sectional view of a portion of a turbine according to a further embodiment of the present disclosure. This embodiment is identical to the embodiment shown in FIGS. 2 to 3d except for the differences described below. Corresponding features are given the same reference numerals.

In this embodiment, for each bypass passage 150, the inlet and outlet passages 154, 155 are provided in the sleeve 128, with the bypass chamber 157 provided in the bearing housing 103. Additionally, or alternatively, a corresponding arrangement may be used for the second bypass passage 170.

Figure 10:
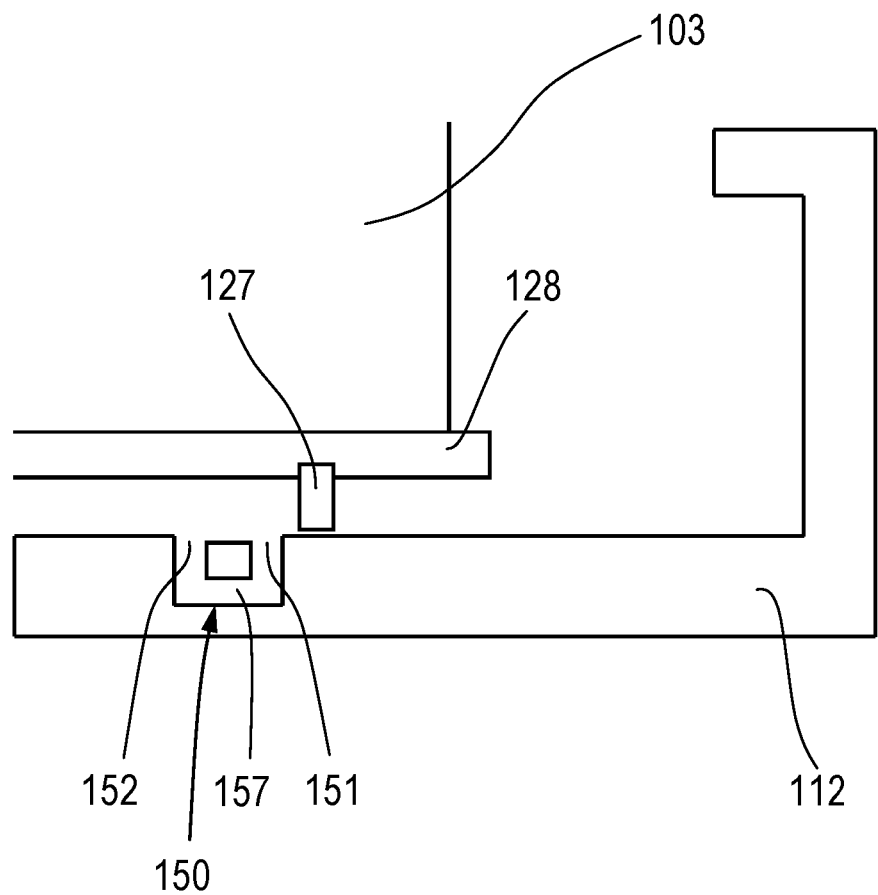
FIG. 10 shows a schematic cross-sectional view of a portion of a turbine according to a further embodiment of the present disclosure.

Referring to FIG. 10, there is shown a schematic cross-sectional view of a portion of a turbine according to a further embodiment of the present disclosure. This embodiment is identical to that shown in FIGS. 2 to 3d, except for the differences described below. Corresponding features are given the same reference numerals.

In this embodiment, the bypass passage 150 is provided in the movable shroud 112 is movable, with the inlet and outlet ports 151, 152 provided in a surface of the movable shroud 112 adjacent to an opposed surface of the sleeve 128. The seal 127 is mounted within a cavity in said opposed surface of the sleeve 128.

It will be appreciated that the same advantage is obtained with this embodiment, as with the first embodiment. However, in this case, as the moveable shroud 112 moves inboard, from a fully open position, the inlet bypass port 151 moves inboard of the seal 127, thereby 'opening' the inlet bypass port 151, i.e. allowing flow to pass from a region of the cavity inboard of the seal 127, through the bypass inlet port 151, through the bypass passage 150 and out of the bypass outlet port 152 to the secondary inlet passageway. Once the outboard side of the bypass inlet port 151 passes the inboard side of the seal 127, the inlet bypass port is fully 'opened'.

As the outlet bypass port 152 continues to move inboard, it passes the seal 127 which then begins to 'close' the outlet bypass port 152, i.e. reducing the flow that can pass through the outlet bypass port 152 into the bypass passage. Accordingly, this allows the level of bypass flow to be controlled as above.

Numerous modifications and variations may be made to the exemplary design described above without departing from the scope of the disclosure as defined in the claims.

For example, in the described embodiments, the shroud 112 is axially movable and the nozzle ring 110 is fixed. Alternatively, the shroud 112 may be axially fixed and the nozzle ring 110 axially movable relative to the shroud 112, whose radial surface corresponds to the facing wall of the housing.

In this case, the seal 127 may be mounted on the nozzle ring 110, so as to move with the nozzle ring relative to the bypass passage(s)/recess 150, 170, 160.

In the described embodiment, the movable wall member is mounted, for said axial movement, in an annular cavity provided in the turbine housing. Alternatively, the movable wall member may be mounted in an annular cavity provided in the bearing housing.

In the described embodiment the first bypass passage 150, the second bypass passage and/or the recess are provided in the cylindrical sleeve 128. Alternatively, or additionally, the first bypass passage 150, the second bypass passage and/or the recess may be provided in any housing of the variable geometry turbine, for example the bearing housing.

The invention claimed is:

1. A variable geometry turbine comprising:
   a turbine wheel supported in a housing for rotation about a turbine axis;
   an annular primary inlet passageway extending radially inwards towards the turbine wheel, the primary inlet passageway being defined between a surface of a radial wall of a moveable wall member and a surface of a facing wall of the housing;
   the moveable wall member being mounted within an annular cavity provided within the housing, the movable wall member being moveable axially to vary the width of the primary inlet passageway;

an annular seal being mounted to one of the movable wall member and an adjacent housing member to provide a seal between adjacent surfaces of the movable wall member and adjacent housing member respectively;

wherein a bypass passage is provided in the other of said movable wall member and adjacent housing member, the bypass passage extending from an inlet bypass port to an outlet bypass port, said inlet and outlet bypass ports being axially spaced from each other and provided in said adjacent surface of said other of the movable wall member and adjacent housing member;

a secondary inlet passageway fluidly connecting a region of the cavity outboard of the seal to the turbine wheel such that flow in the secondary inlet passageway bypasses at least a portion of the primary inlet passageway;

the bypass passage and the annular seal being arranged such that as the movable wall member moves axially, the annular seal moves axially relative to the inlet and outlet bypass ports so as to vary the extent of flow that may pass from a region of the cavity inboard of the seal, through the bypass passage to the secondary inlet passageway.

2. The variable geometry turbine according to claim 1 wherein the movable wall member is axially movable relative to the facing wall of the housing, between first and second configurations, wherein in the first configuration the seal is positioned relative to the inlet and outlet bypass ports such that flow may pass from the region of the cavity inboard of the seal to the secondary inlet passageway, via the bypass passage and in the second configuration the seal is positioned relative to the inlet and outlet bypass ports such that flow is substantially prevented from passing from the region of the cavity inboard of the seal to the secondary inlet passageway, via the bypass passage.

3. The variable geometry turbine according to claim 2 wherein when the movable wall member is in the first configuration, the movable wall member is in a first position relative to the facing wall of the housing.

4. The variable geometry turbine according to claim 3 wherein when the movable wall member is in the first position, the seal is provided at least partially outboard of the inlet bypass port such that it does not cover the inlet bypass port or only partially covers the inlet bypass port.

5. The variable geometry turbine according to claim 3 wherein when the movable wall member is in the first position, the seal is provided at least partially inboard of the outlet bypass port such that it does not cover the outlet bypass port or only partly covers an inboard portion of the outlet bypass port.

6. The variable geometry turbine according to claim 3 wherein when the movable wall member is in the first position, the seal is disposed axially between the inlet and outlet bypass ports.

7. The variable geometry turbine according to claim 1 wherein the inlet and outlet bypass ports are axially separated by a section of said other of said movable wall member and said adjacent housing member.

8. The variable geometry turbine according to claim 1 wherein the outlet bypass port has a cross-sectional area that is the same, or greater than, the cross-sectional area of the inlet bypass port.

9. The variable geometry turbine according to claim 2 wherein when the movable wall member is in the second configuration, the movable wall member is in a second position relative to the facing wall of the housing.

10. The variable geometry turbine according to claim 1 wherein the bypass passage forms a passage that is enclosed between the inlet and outlet ports.

11. The variable geometry turbine according to claim 1 wherein the bypass passage comprises an inlet passage that fluidly connects the inlet bypass port to a bypass chamber and an outlet passage that fluidly connects the bypass chamber to the outlet bypass port.

12. The variable geometry turbine according to claim 1 wherein the seal is mounted to the movable wall member, with the bypass passage provided in said adjacent housing member, the inlet and outlet bypass ports being provided in said adjacent surface of the adjacent housing member.

13. The variable geometry turbine according to claim 1 wherein the seal is mounted to the adjacent housing member, with the bypass passage provided in the movable wall member, the inlet and outlet bypass ports being provided in said adjacent surface of the movable wall member.

14. The variable geometry turbine according to claim 1 wherein the adjacent housing member comprises an axially extending annular sleeve.

15. The variable geometry turbine according to claim 1 wherein the bypass passage forms a first bypass feature, wherein a second bypass feature, defining a bypass flow path, is provided in said other of said moveable wall member and said adjacent housing member, and is arranged such that as the movable wall member moves axially, the annular seal moves axially relative to the second bypass feature so as to vary the extent of flow that may pass from the region of the cavity inboard of the seal, through the bypass flow path to the secondary inlet passageway.

16. The variable geometry turbine according to claim 15 wherein the second bypass feature comprises a slot or recess, provided in said other of said movable wall member and said adjacent housing member, that defines said bypass flow path.

17. The variable geometry turbine according to claim 16 wherein the movable wall member is axially movable relative to the facing wall of the housing, between third and fourth configurations, wherein in the third configuration the seal is positioned relative to the second bypass feature such that flow may pass from a region of the cavity inboard of the seal to the secondary inlet passageway, via the second bypass flow path and in the fourth configuration the seal is positioned relative to the second bypass feature such that flow is substantially prevented from passing from the region of the cavity inboard of the seal to the secondary inlet passageway, via the second bypass flow path.

18. The variable geometry turbine according to claim 1 wherein a particulate filter is provided in the bypass passage such that flow passing through the bypass passage passes through the particulate filter, with the particulate filter being contacted by particulate matter flowing through the particulate filter.

19. The turbocharger comprising a variable geometry turbine according to claim 1 and a compressor comprising a housing defining an inlet and an outlet, and a chamber between the inlet and outlet, within which an impeller wheel is rotatably mounted such that rotation of the impeller wheel compresses air received through the inlet and passes the compressed air to the outlet, wherein the turbine wheel of the turbine is coupled to the impeller wheel so as to drivably rotate the impeller wheel.

20. A method of operating an engine system comprising an internal combustion engine and a turbocharger wherein the turbocharger comprises a variable geometry turbine according to claim 1 and a compressor comprising a housing defining an inlet and an outlet, and a chamber between the inlet and outlet, within which an impeller wheel is rotatably mounted such that rotation of the impeller wheel compresses air received through the inlet and passes the compressed air to the outlet, wherein the turbine wheel of the turbine is coupled to the impeller wheel so as to drivably rotate the impeller wheel and the turbocharger is arranged such that exhaust gas from the internal combustion engine drivably rotates the turbine wheel of the turbine, wherein the movable wall member is moved between first and second configurations when the engine system is operated in an engine braking mode, a thermal regeneration mode or an exhaust gas heating mode.

* * * * *